US009976434B2

(12) United States Patent
Aksit

(10) Patent No.: US 9,976,434 B2
(45) Date of Patent: May 22, 2018

(54) BRUSH SEAL ASSEMBLY

(71) Applicant: DOOSAN HEAVY INDUSTRIES CONSTRUCTION CO., LTD., Gyeongsangnam-do (KR)

(72) Inventor: Mahmut Faruk Aksit, Istanbul (TK)

(73) Assignee: DOOSAN Heavy Industries Construction CO., LTD., Gyeongsangnam-do (KR)

(*) Notice: Subject to any disclaimer, the term of this patent is extended or adjusted under 35 U.S.C. 154(b) by 0 days. days.

(21) Appl. No.: 14/733,689

(22) Filed: Jun. 8, 2015

(65) Prior Publication Data
US 2015/0354390 A1 Dec. 10, 2015

(30) Foreign Application Priority Data

Jun. 9, 2014 (KR) .................. 10-2014-0069608
Jun. 9, 2014 (KR) .................. 10-2014-0069609

(51) Int. Cl.
F01D 11/02 (2006.01)
F01D 11/08 (2006.01)
(Continued)

(52) U.S. Cl.
CPC ............ *F01D 11/08* (2013.01); *F01D 11/001* (2013.01); *F01D 11/02* (2013.01); *F16J 15/3268* (2013.01);
(Continued)

(58) Field of Classification Search
CPC .... F16J 15/3268; F16J 15/3288; F16J 15/442; F01D 11/08; F01D 11/025; F01D 11/06;
(Continued)

(56) References Cited

U.S. PATENT DOCUMENTS 6,250,641 B1   6/2001 Dinc et al.
6,718,774 B2 * 4/2004 Razzell ................. F01D 25/243
                                                60/753
(Continued)

OTHER PUBLICATIONS

Chinese Office Action issued by the State Intellectual Property Office of the People's Republic of China dated May 4, 2016 in connection with Chinese patent application No. 201510295895.0.
An extended European search report issued by the European Patent Office dated Oct. 15, 2015 in connection with European patent application No. 15171238.7.

Primary Examiner — Nathan Cumar
(74) Attorney, Agent, or Firm — Invenstone Patent, LLC

(57) ABSTRACT

A brush seal assembly may include a packing body that includes an insertion groove formed inward in a circumferential direction. The insertion groove may be positioned between a rotating body and a fixed body. The packing body may include insertion holes having openings disposed toward the insertion groove at different positions and in different directions. A brush seal part includes a brush and a support member that supports the brush. The brush may extend toward the rotating body when brush is disposed in the insertion groove. A thermal expansion member may adhere to a side of the support member and thermally expand in a circumferential direction of the packing body. Fixing members may be inserted into the insertion holes, respectively, from an outside of the packing body to maintain a fixed state of the brush seal part in radial and circumferential directions of the packing body.

20 Claims, 19 Drawing Sheets

(51) Int. Cl.
*F16J 15/3268* (2016.01)
*F16J 15/3288* (2016.01)
*F16J 15/44* (2006.01)
*F01D 11/00* (2006.01)

(52) U.S. Cl.
CPC ......... *F16J 15/3288* (2013.01); *F16J 15/442* (2013.01); *F05D 2220/30* (2013.01); *F05D 2220/31* (2013.01); *F05D 2240/56* (2013.01)

(58) Field of Classification Search
CPC ...... F01D 11/003; F01D 11/001; F01D 11/02; F05D 2220/30; F05D 2220/31; F05D 2240/56
USPC ................ 277/355, 359, 360, 931–933, 471
See application file for complete search history.

(56) References Cited

U.S. PATENT DOCUMENTS

| | | | |
|---|---|---|---|
| 6,790,001 B2 | 9/2004 | Turnquist et al. | |
| 2001/0004145 A1* | 6/2001 | Wright ................ | F16J 15/3288 277/355 |
| 2004/0000761 A1* | 1/2004 | Addis ................. | F16J 15/3288 277/355 |
| 2005/0073106 A1* | 4/2005 | Thermos ............. | F16J 15/3288 277/413 |
| 2005/0151325 A1* | 7/2005 | Wright ................ | F16J 15/164 277/358 |
| 2006/0249911 A1* | 11/2006 | Kowalczyk ......... | F16J 15/3288 277/355 |

* cited by examiner

BRUSH SEAL ASSEMBLY

CROSS-REFERENCE TO RELATED APPLICATION(S)

This application claims priority to Korean Patent Application Nos. 10-2014-0069608, filed on Jun. 9, 2014, and 10-2014-0069609, filed on Jun. 9, 2014, the disclosures of each of which are incorporated herein by reference in their entirety.

BACKGROUND

Exemplary embodiments of the present disclosure relate to a brush seal, and more particularly, to a brush seal assemble used to seal a gap between a fixed body and a rotating body of a turbine.

Generally, a turbine is a power generation apparatus that converts heat energy of a fluid like gas, steam, or the like into a torque, which is mechanical energy. A turbine may include a rotor that has a plurality of buckets to rotate a shaft by the fluid and a casing that is installed to enclose a circumference of the rotor. The casing may include a plurality of diaphragms.

Herein, a gas turbine may include a compressor, a combustor, and a turbine, in which external air is sucked and compressed by a rotation of the compressor and is then delivered to the combustor. The combustor performs combustion by mixing the compressed air and fuel, and high-temperature and high-pressure gas generated from the combustor rotates the rotor of the turbine while passing through the turbine to drive a power generator.

The gas turbine and a steam turbine has a structure in which the fixed body (diaphragm) and the rotating body (rotor) relatively rotate to each other and therefore a high-temperature and high-pressure fluid is leaked through the gap between the fixed body and the rotating body. Here, the fluid leakage is one cause of reduction in energy efficiency due to a power loss. Accordingly, efforts to reduce the fluid leakage which occurs through the gap between the fixed body and the rotating body have been continuously made.

To reduce the fluid leakage, it is preferable to reduce the gap between the fixed body and the rotating body but there are restrictions in making the gap narrow.

For example, in the case in which the gap is excessively narrow, an interference occurs between the rotating body and the fixed body when the rotating body rotates about the shaft and thus vibrations occurs due to rubbing, which leads to serious damage to the turbine.

Meanwhile, since the rotating body and the fixed body are exposed to heat due to high-temperature steam introduced from a boiler, when the steam turbine is operated and the operation thereof stops, the steam turbine expands or contracts from several mm to tens of mm depending on its position. In this case, the rotating body and the fixed body expand differently due to different characteristics of materials and expand in different directions depending on a structure of the turbine. This may cause interference while the rotor and the stator are operated, and as a result, rubbing may occur.

A labyrinth seal may be used to promote sealing. A brush seal may be coupled with the labyrinth seal to reduce or eliminate the gap between the fixed body and the rotating body and promote sealing in a form which the stator and the rotor flexibly contact each other.

BRIEF SUMMARY

An object of the present disclosure relates to stably fix a brush seal assembly at different positions and in different directions to enhance efficiency of a turbine in which the brush seal assembly is installed and always move a predetermined quantity of fluid through a brush seal.

Another object of the present invention is to constantly maintain a moving quantity of fluid regardless of a change in pressure applied to a brush seal.

Other objects and advantages of the present disclosure can be understood by the following description, and become apparent with reference to the embodiments of the present invention. Also, it will be apparent to those skilled in the art to which the present disclosure pertains that the objects and advantages of the present disclosure can be realized by the means as claimed and combinations thereof.

In accordance with one aspect of the present disclosure, a brush seal assembly includes: a packing body configured to include an insertion groove which is positioned between a rotating body and a fixed body and formed inward in a circumferential direction and insertion holes which are opened toward the insertion groove at different positions and in different directions; a brush seal part configured to include a brush extending toward the rotating body in a state in which the brush is inserted into the insertion groove and a support member supporting the brush; a thermal expansion member configured to adhere to a side of the support member and be thermally expanded in a circumferential direction of the packing body; and fixing members configured to be inserted into the insertion holes, respectively, from an outside of the packing body to maintain a fixed state of the brush seal part in a radial direction and a circumferential direction of the packing body.

The insertion hole may include: first insertion holes configured to be opened toward the insertion grooves in the radial direction of the packing body; and second insertion holes configured to be opened toward the insertion grooves from the outside of the packing body.

The second insertion hole may be positioned between the first insertion holes spaced apart from each other at a predetermined interval.

The fixing member may include: a first fixing member configured to be inserted into the first insertion hole; and a second fixing member configured to be inserted into the second insertion hole.

The first fixing member may include: a body configured to surface-contact an upper surface of the brush seal part; and a head configured to be formed on the upper surface of the body and coupled with the first insertion hole in a form in which the head is completely inserted into an inside of the first insertion hole.

The body may have some section of a lower end which is not provided with a thread and may be made of a thermal expansion material to be thermally expanded in the radial direction of the packing body.

The support part may include: a first support plate adhering to one side of the brush and provided with a guide groove to guide a flow of fluid from an inside facing the brush toward a lower portion of the brush; and a second support plate adhering to a brush in a state in which the second support plate faces the first support plate and formed at a position at which the second support plate faces a thermal expansion member.

The thermal expansion members may be independently disposed to face each other based on the insertion hole.

In accordance with another aspect of the present disclosure, a brush seal assembly includes: a packing body configured to include an insertion groove which is positioned between a rotating body and a fixing body and formed inward in a circumferential direction, a first insertion hole which is opened toward the insertion groove in a radial direction on an outer circumferential surface, and second insertion holes which is positioned at a different position from the first insertion hole and is opened toward the insertion groove; a brush seal part configured to include a brush extending toward the rotating body in a state in which the brush is inserted into the insertion groove and a support member supporting the brush; a thermal expansion member configured to adhere to a side of the support member and be thermally expanded in a circumferential direction of the packing body; and fixing members configured to be inserted into the first and second insertion holes, respectively, from an outside of the packing body to maintain a fixed state of the brush seal part in the radial direction and the circumferential direction of the packing body.

The second insertion hole may be opened toward the thermal expansion member and positioned between the first insertion holes spaced apart from each other at a predetermined interval.

The fixing member may include: a first fixing member configured to be inserted into the first insertion hole; and a second fixing member configured to be inserted into the second insertion hole; and wherein the first fixing member is pressed inward in the radial direction of the packing body in a state in which a lower end of the first fixing member adheres to an upper surface of the brush seal part and the second fixing member is positioned at a center of the thermal expansion member to prevent the packing body from moving in the circumferential direction.

The first fixing member may includes: a body configured to surface-contact an upper surface of the brush seal part; and a head configured to be formed on the upper surface of the body and coupled with the first insertion hole in a form in which the head is completely inserted into an inside of the first insertion hole, wherein the body has some section of a lower end which is not provided with a thread and is made of a thermal expansion material to be thermally expanded in the radial direction of the packing body.

In accordance with still another aspect of the present disclosure, a brush seal assembly includes: a packing body configured to include an insertion groove which is positioned between a rotating body and a fixing body and formed inward in a circumferential direction and an insertion hole opened toward an insertion groove in a radial direction on an outer circumferential surface; a brush seal part configured to include a brush seal body inserted into an insertion groove while being provided with a brush extending toward the rotating body and an inclined surface inclined along a length direction while facing the insertion hole; and fixing members configured to be inserted into the insertion holes, respectively, to maintain a fixed state of the brush seal part in a radial direction and a circumferential direction of the packing body in an adhering state to the inclined surface.

The fixing member may include: a head configured to surface-contact the brush seal part and inclined at the same inclined angle as the inclined surface; and a body configured to extend to an upper portion of the head.

The head may be made of a different material from the body and thermally expanded toward the inclined surface by high temperature conducted from the rotating body.

In accordance with still yet another aspect of the present disclosure, a brush seal assembly includes: a packing body configured to include an insertion groove which is positioned between a rotating body and a fixing body and formed inward in a circumferential direction and an insertion hole opened toward an insertion groove in a radial direction on an outer circumferential surface; a brush seal part configured to include a brush extending toward the rotating body in a state in which one end of the brush seal part is inserted into the insertion groove and a support member supporting the brush; a thermal expansion member configured to adhere to a side of the support member and be thermally expanded in a circumferential direction of the packing body; and a fixing member configured to be inserted into the insertion hole and provided with a protrusion protruding in one direction to be fixed in a side and a circumferential direction of the brush seal part.

The protrusions may be disposed on the packing body to face each other.

The fixing member may include: a head configured to be maintained in a surface-contacted state with the thermal expansion member; a body configured to extend to an outside of the head, wherein the head is conducted with high-temperature heat to be thermally expanded toward the thermal expansion member.

The thermal expansion member may include an inclined surface of which both ends in a length direction are inclined toward the fixing member, the head may include a head inclined surface which is surface-contacted in a state adhering to the inclined surface and pressing may be made between the head and the head inclined surface due to the thermal expansion in the sealed state between the head and the head inclined surface when high-temperature heal is conducted to the thermal expansion member and the head.

The thermal expansion member may have only a predetermined section of both ends in a length direction made of a thermal expansion material to be thermally expanded.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

A configuration of a brush seal assembly according to a first exemplary embodiment of the present disclosure will be described with reference to the accompanying drawings. For reference, FIG. 1 illustrates an example in which a labyrinth seal 10 and a brush seal 1 is applied to a gap between a fixed body and a rotating body of a steam turbine.

Figure 1:
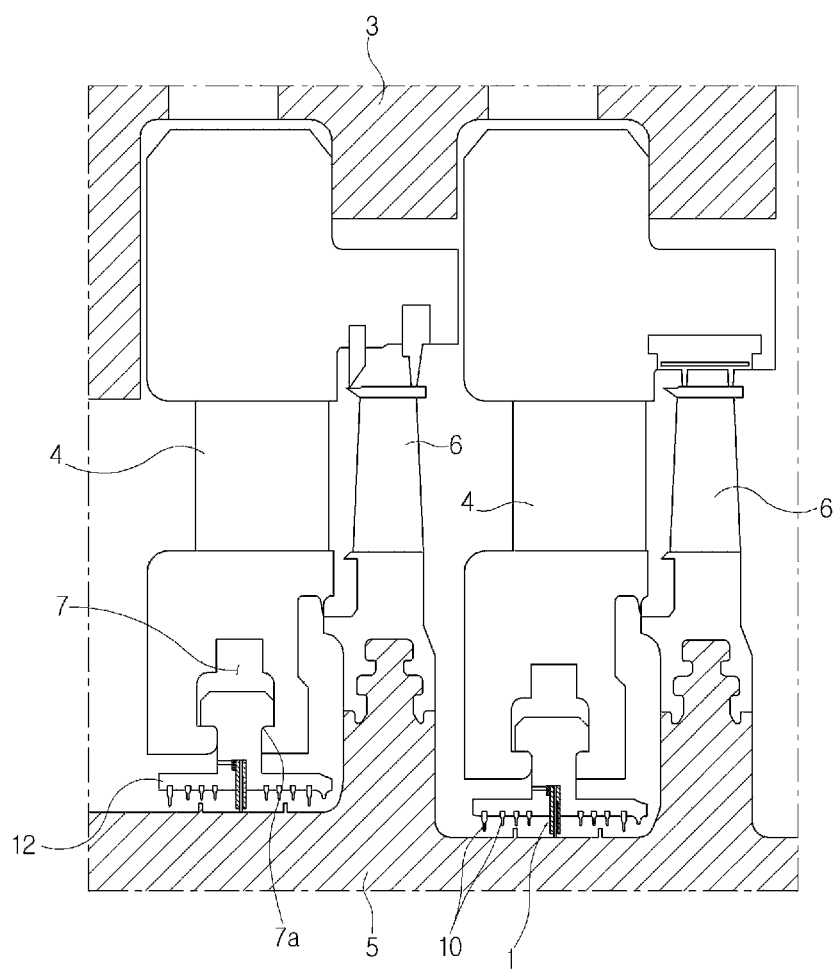
FIG. 1 is a cross-sectional view illustrating a state in which a brush seal assembly according to a first exemplary embodiment of the present disclosure is positioned between a rotating body and a stator body.
Figure 2:
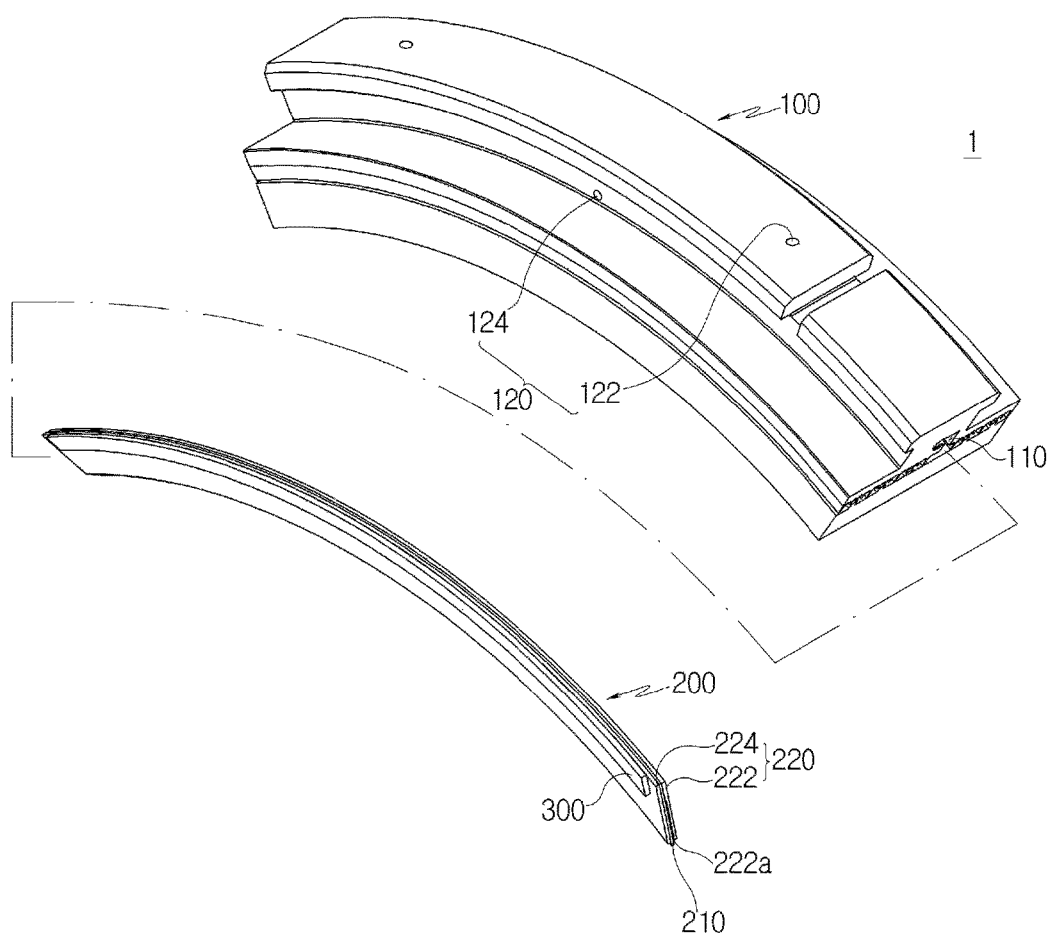
FIG. 2 is an exploded perspective view of the brush seal assembly according to the first exemplary embodiment of the present disclosure.
Figure 3:
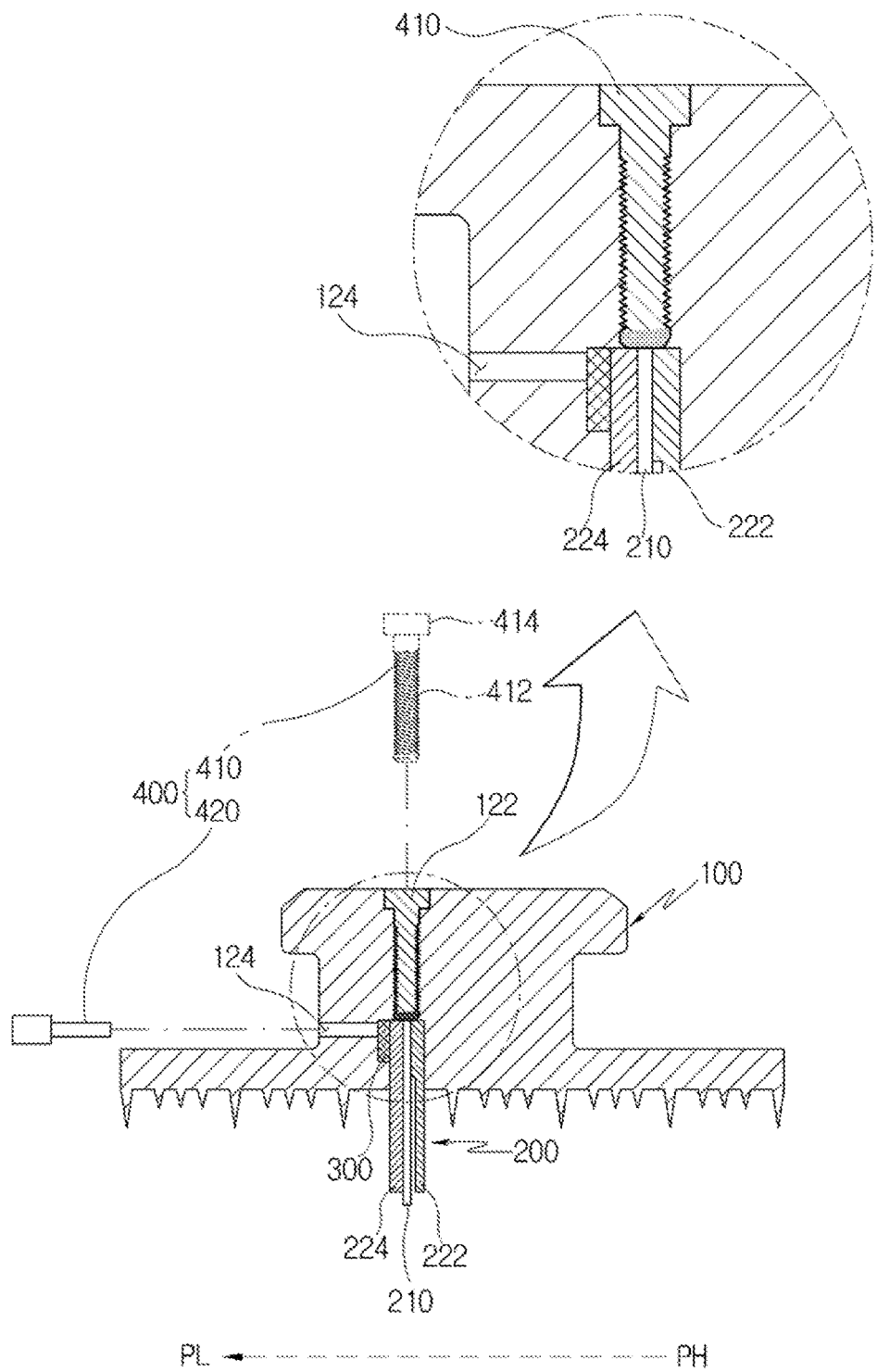
FIG. 3 is a coupled cross-sectional view of the brush seal assembly according to the first exemplary embodiment of the present disclosure.

Referring to FIGS. 1 to 3, the fixed body includes a casing 3 and a diaphragm 4 and the rotating body includes a rotor 5 and a bucket 6. The diaphragm 4 is coupled with the casing 3 and is disposed to be adjacent to the bucket 6. The bucket 6 integrally rotates with the rotor 5 in the state in which it is adjacent to the diaphragm 4.

There is a need to seal a gap between the diaphragm 4 and the bucket 6 and the gap between the diaphragm 4 and the rotor 5 for airtightness. For this purpose, the brush seal assembly 1 is used.

The brush seal assembly 1 may include the packing body 100, the brush seal part 200, the thermal expansion members 300, and the fixing members 400, in which the brush seal part 200 stably maintains the airtightness between the rotating body rotating at a predetermined speed and the fixed body.

In this case, the brush seal parts 200 may be fixed in a radial direction and a circumferential direction of the packing body 100 depending on the heat conduction transferred to the brush seal part 200 through the rotor 5 and is fixed inward or outward in the radial direction by the fixing member 400 to stably maintain airtightness.

For this purpose, according to the exemplary embodiment of the present disclosure, the packing body 100, which may be positioned between the rotor 5 and the fixed body, may be formed with the insertion groove 110 that is positioned to face the rotor 5. A plurality of individual units of the packing bodies 100 may be assembled in a ring shape in the outer circumferential direction of the rotor 5. That is, FIG. 2 illustrates one of the packing body 100, but when being assembled, the overall shape may be a ring shape. For this purpose, the packing body 100 has a shape rounded in one direction and the plurality of packing bodies 100 are installed outside the rotor 5, while being assembled in an adhering state to each other.

An outer circumferential surface of the packing body 100 is provided with insertion holes 120 which are opened at different positions and in different directions toward the insertion grooves 110 in a radial direction on the outer circumferential surface. The insertion holes 120 include first insertion holes 122, which are opened in the radial direction of the packing body 100, and second insertion holes 124, which are opened from a side of the outer circumferential surface toward the insertion groove 110.

The first insertion hole 122 and the second insertion hole 124 are each opened in the state in which the position and the direction are different. The first insertion holes 122 are positioned on an upper surface based on the brush seal part 200 while being opened at a predetermined interval and the first insertion holes 122 are opened toward the radial direction of the packing body 100. The second insertion hole 124 is positioned on a side based on the brush seal part 200 while being opened and the second insertion hole 124 is formed in a state orthogonal to the first insertion hole 122 to be opened toward the circumferential direction of the brush seal part 200.

The insertion groove 110 is inserted with the brush seal part 200 to be described below and the first and second insertion holes 122 and 124 are inserted with the fixing member 400 to fix the brush seal part 200.

Further, the brush seal part 200 may maintain the pressed state in the radial direction and the circumferential direction of the packing body 100 by the fixing member 400 to pass the high-pressure fluid moving through the brush 210 as much as a constant quantity so as to prevent unnecessary leakage, thereby stabilizing efficiency of an object in which the brush seal assembly 1 is installed.

Therefore, even when the brush seal part 200 is directly or indirectly rubbed with the rotor 5 over a long period of time, the sealing loss due to abrasion and deformation is reduced and the gap between the brush 210 and the rotor 5 is constantly maintained.

In particular, when the gap between the rotor 5 and the brush 210 is excessively spaced apart from each other, the high-pressure fluid may be leaked and therefore the power loss of the rotor 5 may be caused.

Further, when the rotor 5 and the brush excessively adhere to each other, an interference may occur between the rotor 5 and the fixed body, and as a result, constantly maintaining the gap between the rotor 5 and the brush 210 is considered to be important.

The brush seal part 200 includes the brush 210 which extends toward the rotor 5 in the state in which it is inserted into the insertion groove 110. A support member 220 supports the brush 210. A side of the brush seal part 200 is provided with the thermal expansion member 300, which adheres to a side of the support member 220, that thermally expands in the circumferential direction of the packing body.

Further, the fixing members 400 are inserted into the first and second insertion holes 122 and 124, respectively, from the outside of the packing body 100 to maintain the fixed state of the brush seal part 200 in the radial direction and the circumferential direction of the packing body 100.

The first insertion holes 122 are opened at a center of the upper surface of the brush seal part 200 and are opened in a state orthogonal to the packing body 100 while being spaced apart from each other at a predetermined interval. Therefore when the fixing member 400 is inserted, the first insertion holes 122 is maintained in the state in which it adheres to the outer circumferential surface of the packing body 100, thereby stably maintaining a fixing force applied by the fixing member 400 regardless of the position.

An inner circumferential surface of the first insertion hole 122 is formed with a thread and the fixing member 400 may be a screw to stably maintain the fixing of the brush seal part 200 through the packing body 100.

The second insertion hole 124 is opened toward the inside of the packing body 100 from the side thereof, not an upper portion thereof, based on the outer circumferential surface of the packing body 100. For example, the second insertion hole 124 is positioned between the first insertion holes 122 spaced apart from each other at a predetermined interval or is formed at a middle position between the first insertion holes 122 which are spaced apart from each other.

Figure 4:
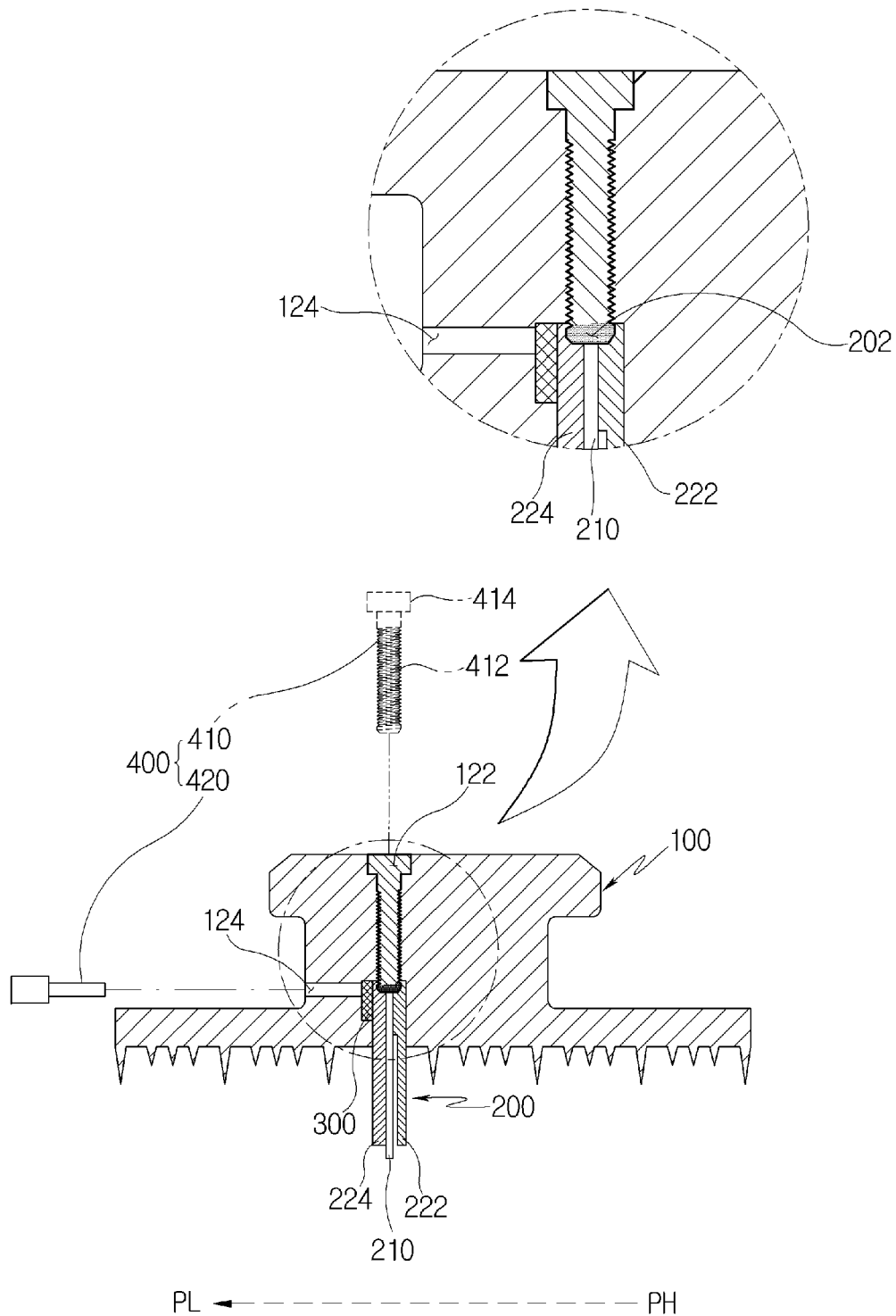
FIG. 4 is a coupled cross-sectional view of a brush seal assembly according to another exemplary embodiment of the present disclosure.

Referring to FIG. 4, the brush seal assembly 1 includes a third insertion hole 202 formed on the upper surface of the brush seal part 200 so that a lower end of the first fixing member 410 may be partially inserted. As such, when the first fixing member 410 is connected, for example by threading a screw, with the third insertion hole 202, the fixed state of the brush seal part 200 may be stably maintained by the first fixing member 410, the gap between the rotor 5 and the brush 210 may be maintained constantly, and the state adhering to the insertion groove 110 may be constantly maintained, thereby preventing the fluid from being leaked. Further, an upper portion of the brush seal part 200 is fixed by the first fixing member 410 and therefore even when the pressing force is applied from a lower portion of the brush seal part 200 toward the upper portion thereof, the fixed state is stably maintained.

The support member 220 includes the first support plate 222 which adheres to one side of the brush 210 and the second support plate 224 which adheres to the other side of the brush 210. The first support plate 222 is provided with the guide groove 222a to guide the flow of fluid from the inside facing the brush 210 toward the lower portion of the brush 210 so as to induce the flow of the high-pressure fluid to the gap between the rotor 5 and the brush 210, thereby providing stable movement. Therefore, when the high-pressure fluid moves to the brush 210 through the first support plate 222, the unnecessary eddy phenomenon may be reduced and the flow of fluid toward the lower end of the brush 210 may be induced.

For reference, the pressure at the right of the brush 210 (PH) is relatively higher than the pressure at the left of the brush 210 (PL). The flow of the fluid moves from the right to the left as illustrated by a dotted arrow, and the brush 210 may prevent the fluid in the high-pressure region from being leaked to the low-pressure region.

The thickness of the second support plate 224 is formed to correspond to that of the first support plate 222 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove (not illustrated) may be formed at a position facing the thermal expansion member 300 to stably install and expand the thermal expansion member 300.

The brush 210 may be made of a plurality of bristles. The first support plate 222 and the second support plate 224 adhere to each other based on the brush 210 and may be inclined upward when being viewed from the top.

The reason is that the brush 210 is directly or indirectly rubbed with the rotor 5 and therefore the stress is continuously applied to the brush 210, such that the lower end of the brush 210 is not positioned in the packing body 100 in the vertical state to the rotor 5 but is positioned in the insertion groove 110 in the state inclined by 45 degrees to reduce the stress applied from the rotor 5.

Figure 5:
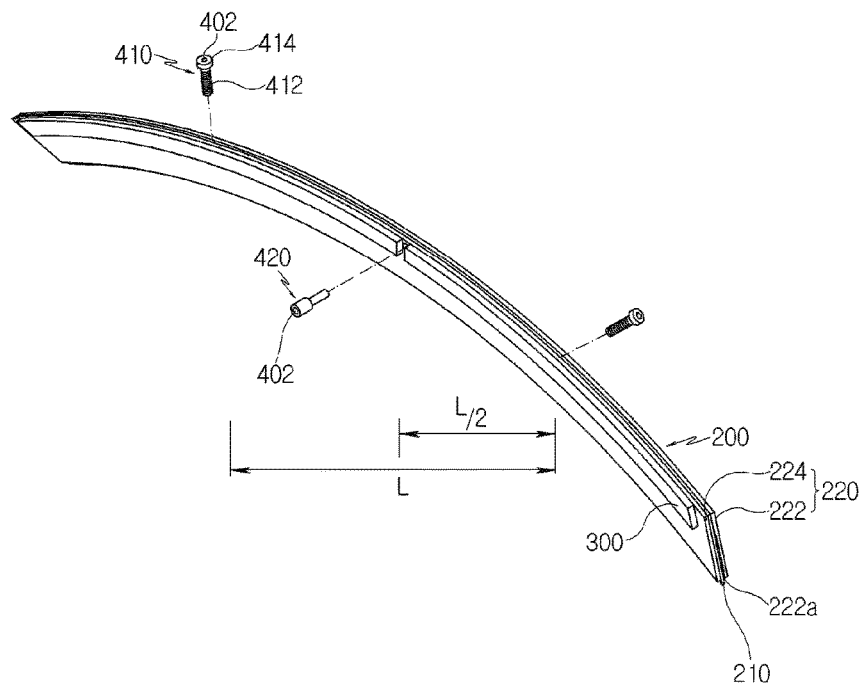
FIG. 5 is a perspective view illustrating a state in which a fixed member is coupled with a brush seal part according to a first exemplary embodiment of the present disclosure.

Referring to FIG. 5, the second insertion hole 124 is opened at a position of ½*L if it is assumed that a distance between the first insertion holes 122 is L to fix the brush seal part 200.

The second insertion hole 124 may be opened at the left, the right, or both sides based on a front surface of the packing body 100. In this exemplary embodiment of the present disclosure, the second insertion hole 124 is opened at the left of the packing body 100 but it is to be noted that the position of the second insertion hole 124 may be changed.

The first and second insertion holes 122 and 124 may be formed with threads in the circumferential direction inside thereof. Alternatively, the first insertion hole 122 may be formed with a thread and the second insertion hole 124 may not be formed with a thread.

The thermal expansion member 300 extends along the length direction of an upper surface of a second support plate 224 in the adhering state and receives heat transferred from the high-temperature fluid and thus is thermally expanded in the circumferential direction of the packing body 100.

Figure 6:
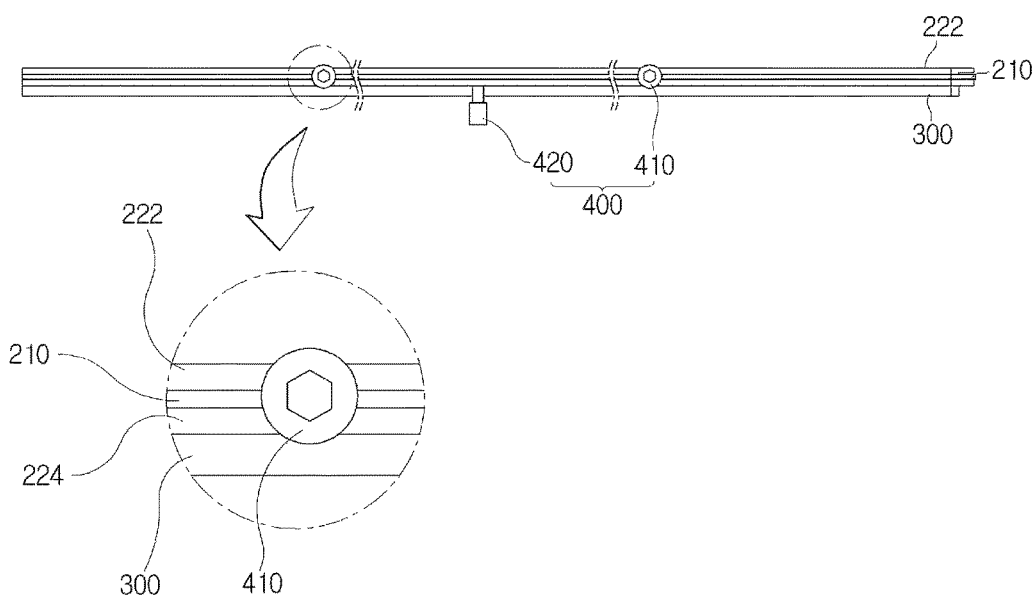
FIG. 6 is a plan view illustrating a state in which the fixed member is fixed to the brush seal part according to a first exemplary embodiment of the present disclosure.
Figure 7:
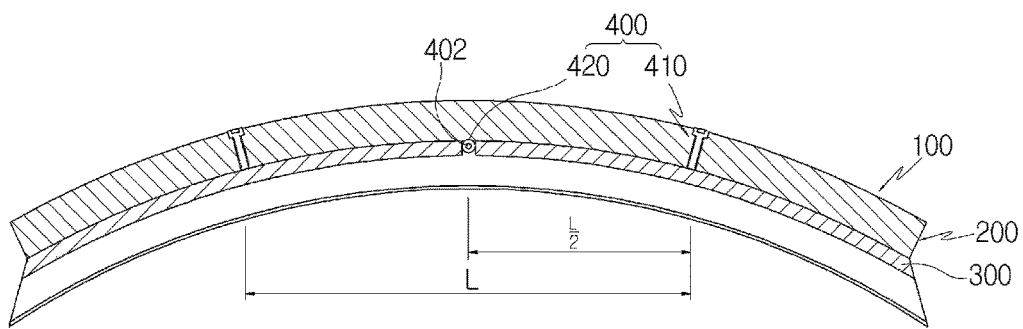
FIG. 7 is a longitudinal cross-sectional view of the brush seal assembly according to a first exemplary embodiment of the present disclosure.

Referring to FIGS. 5 to 7, the fixing members 400 include a first fixing member 410 inserted into the first insertion hole 122 and a second fixing member 420 inserted into the second insertion hole 124 to stably fix the position of the brush seal part 200 due to high-temperature heat and vibration transferred through the rotor 5 and the high-temperature fluid supplied to the brush seal part 200.

In particular, according to the exemplary embodiment of the present disclosure, the first insertion hole 122 into which the first fixing member 410 is inserted and the second insertion hole 124 into which the second fixing member 420 is inserted are opened at different positions and in different directions and therefore the brush seal parts 200 are each fixed at different positions and in different directions to reduce the movement due to the change in pressure applied to the brush seal part 200 by the high-pressure fluid, thereby constantly maintaining the fluid flow moving through the brush seal part 200.

Further, the fixed state of the brush seal part 200 may be stably maintained in both directions including the radial direction and the circumferential direction by the high-pressure fluid.

As the fixing member, any one of a pin and a bolt may be optionally used and both of the pin and the bolt may be coupled with the packing body 100 and may be stably fixed to the outside of the packing body 100 by welding.

For example, as the first fixing member 410, a bolt may be used and as the second fixing member 420, a pin may be used. Or, a bolt may be used as both of the first and second fixing members 410 and 420. The first and second fixing members are not particularly limited to a specific form and therefore may be variously changed and selectively used.

The first fixing member 410 and the second fixing member 420 may be made of a steel material that does not significantly thermally expand. In this case, the first and second fixing members 410 and 420 fix the brush seal part 200.

For example, the first fixing member 410 may includes a body 412 which contacts the upper surface of the brush seal part 200 and a head 414 which is formed on an upper surface of the body 412, in which the body 414 may be coupled with the first insertion hole 122 in a form in which it is completely inserted into the first insertion hole 122.

Some section of a lower end of the body 412 may not be formed with a thread and may be made of a thermal expansion material. Thus the body 412 may be configured to be thermally expanded in the radial direction of the packing body 100. In this case, a portion of the body 412 may be assembled in the state in which it is threaded into the first insertion hole 122 and may press all the brush seal parts 200 while some section of the lower end of the body 412 is thermally expanded toward the radial direction. As a result, even when the brush seal part 200 is applied with the pressure due to the high-pressure fluid, the gap between the rotor 5 and the brush 210 may not be spaced apart from each other and the gap therebetween may be stably maintained.

As a material of the body 412, a particular material may be selected in consideration of stable thermal expansion.

The second fixing member 420 may be inserted into the second insertion hole 124 from the side of the packing body 100, fixes the brush seal parts 200 in the circumferential direction of the packing body 100, and may prevent the brush seal part 200 from moving along the insertion groove 110 in the circumferential direction to stably maintain the gap between the outer circumferential surface and the brush 210, thereby uniformly maintaining the movement of fluid through the brush seal part 200.

The second fixing member 420 may be inserted into a central position based on the first insertion holes 122 spaced apart from each other and therefore the fixing force may be applied to the center of any one of the brush seal parts 200. The pressing force applied by the first fixing member 410 and the pressing force applied by the second fixing member 420 may be maintained in a balanced state therebetween and thus the brush seal part 200 may be maintained in the stably fixed state.

Describing in more detail, the pressing force applied to the brush seal part 200 by the first fixing member 410 is applied in the radial direction of the brush seal part 200 and the pressing force applied by the second fixing member 420 is applied in the circumferential direction of the brush seal part 200.

In this case, the second fixing member 420 fixes the brush seal part 200 at the position of ½*L if it is assumed that the distance from the first fixing member 410 is L. Therefore, the second fixing member 420 may be fixed to the insertion groove 110 in the state in which the pressing force applied by the first fixing member 410 from a front end portion or a rear end portion of the brush seal part 200 is constantly maintained.

Therefore, the fixing force of the brush seal part 200 is relatively enhanced and thus the occurrence of vibration due to the high-pressure fluid may be reduced.

The second fixing member 420 may be positioned at the center of the thermal expansion member 300 disposed along a length direction of the side of the brush seal part 200. In this case, when the thermal expansion member 300 is thermally expanded in the length direction, the brush seal parts 200 may be prevented from moving in the left and right directions, thereby stably maintaining the state in which the brush seal part 200 is positioned at the regular position.

The fixing member 400 includes a tool insertion groove 402 formed on the upper surface thereof. A tool corresponding to a shape of the tool insertion groove 402 may be inserted thereto and thus the installation and release of the fixing member 400 may be conveniently made. As a result, workability of a worker is enhanced and time required to install and remove the plurality of fixing members 400 is shortened.

Figure 8:
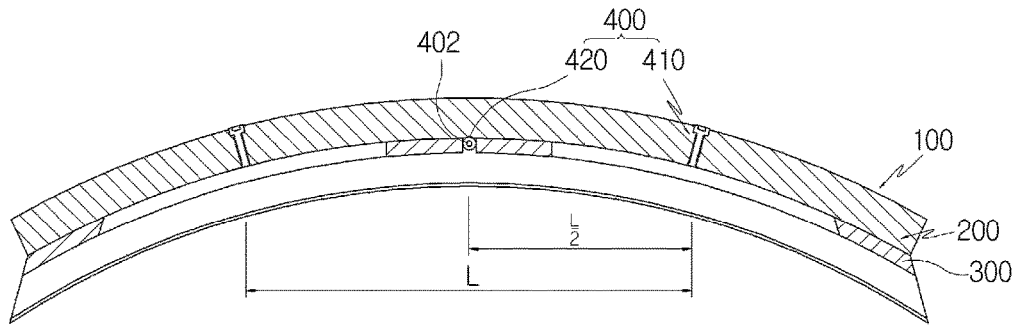
FIG. 8 is a longitudinal cross-sectional view of a brush seal assembly according to a second exemplary embodiment of the present disclosure.

Referring to FIGS. 7 and 8, the thermal expansion member 300 extends along the length direction of the upper surface of a second support plate 224 in the adhering state, receives heat transferred from the high-temperature fluid and thus is thermally expanded in the circumferential direction of the packing body 100.

The thermal expansion members 300 are independently disposed to face each other based on the insertion hole 124, all the thermal expansion members 300 are thermally expanded in the length direction, or may be configured so that only the front and rear end portions thereof may be thermally expanded (see FIG. 8).

The spaced distance between the thermal expansion member 300 and the second fixing member 420 are not particularly limited but when the thermal expansion member 300 is thermally expanded, it is preferably positioned at a close position so that the pressed state by the fixing member 400 is maintained.

A brush seal assembly according to a second exemplary embodiment of the present disclosure will be described with reference to the accompanying drawings. For reference, according to the second exemplary embodiment of the present disclosure, the fixed state is made at different positions based on the outer circumferential surface of the packing body.

Referring to FIGS. 9 to 12, the brush seal assembly 1*a* is includes the packing body which includes the insertion groove 110 positioned between the rotor 5 and the rotating body and formed inward in the circumferential direction, the first insertion hole 120 opened toward the insertion groove 110 in the radial direction on the outer circumferential surface, and the second insertion hole 130 which is positioned at a different position from the first insertion hole 120 and opened toward the insertion groove 110.

Further, the brush seal assembly 1a includes the brush 210 extending toward the rotor 5 (see FIG. 1) in the state in which it is inserted into the insertion groove 110. The brush seal part 200 includes the support member 220 which supports the brush 210. The thermal expansion members 300 adhere to the sides of the support member 220 and thermally expand in the circumferential direction of the packing body 100. The fixing members 400 may each be inserted into the first and second insertion holes 120 and 130 from the outside of the packing body 100 to maintain the fixed state of the brush seal part 200 in the radial direction and the circumferential direction of the packing body 100.

According to the exemplary embodiment of the present disclosure, both of the first insertion hole 120 and the second insertion hole 130 are opened on the upper surface of the brush seal part 200 but the opened position of the first insertion hole 120 and the second insertion hole 130 are different from each other, in which the first insertion holes 120 are spaced apart from each other while facing each other and the second insertion hole 130 is positioned at the middle position between the first insertion holes 120.

The number of first insertion holes 120 may be as illustrated in the drawing or may be changed to stably fix the packing body 100 and the brush seal part 200 by the fixing member 400 inserted into the first insertion holes 120.

The first insertion holes 120 are opened at the center of the upper surface of the brush seal part 200 and are opened in a state orthogonal to the packing body 100 while being spaced apart from each other at a predetermined interval. Therefore, when the fixing member 400 is inserted, the first insertion holes 120 are maintained in the state in which it adheres to the outer circumferential surface of the packing body 100, thereby stably maintaining the fixing force applied by the fixing member 400 regardless of the position.

The inner circumferential surface of the first insertion hole 120 is provided with a thread and is connected with the fixing member 400, which may be a screw, to stably maintain the fixing of the brush seal part 200 through the packing body 100.

The second insertion hole 130 is opened toward the inside of the packing body 100 from the side thereof based on the outer circumferential surface of the packing body 100. For example, the second insertion hole 130 is positioned between the first insertion holes 120 spaced apart from each other at a predetermined interval or is formed at a middle position between the first insertion holes 120 which are spaced apart from each other.

The second insertion hole 130 is opened at the position of ½*L if it is assumed that a distance between the first insertion holes 120 is L, to fix the fixing of the brush seal part 200.

The second insertion hole 130 may be opened at any of the left, the right or both sides based on the front surface of the packing body 100. The exemplary embodiment of the present disclosure describes that the second insertion hole 130 is opened at the left of the packing body 100 but it is to be noted that the position of the second insertion hole 130 may be changed.

The first and second insertion holes 120 and 130 may be formed with threads in the circumferential direction inside thereof. Or, the first insertion hole 120 may be formed with a thread and the second insertion hole 130 may be formed without a thread.

The second insertion hole 130 is opened toward the thermal expansion member 300 but the second fixing member 420 may be inserted without directly contacting the thermal expansion member 300.

The thermal expansion members 300 are independently disposed to face each other based on the second insertion hole 130, in which the thermal expansion members 300 are each installed at the same length in the circumferential direction of the support member 220.

The thermal expansion members 300 conduct heat transferred from the high-temperature fluid and thus are thermally expanded in the circumferential direction of the packing body 100. The thermal expansion members 300 are independently disposed to face each other based on the second insertion hole 130 and may be thermally expanded in the length direction or may be configured so that only the front end portion and the rear end portion thereof are optionally thermally expanded.

The spaced distance between the thermal expansion member 300 and the second fixing member 420 are not particularly limited but when the thermal expansion member 300 is thermally expanded, it is preferably positioned at a close position so that the pressed state by the fixing member 400 is maintained.

The fixing members 400 include the first fixing member 410 inserted into the first insertion hole 120 and the second fixing member 420 inserted into the second insertion hole 130 to provide the stable position fixing of the brush seal part 200 due to high-temperature heat and vibration transferred through the rotor 5 and the high-temperature fluid supplied to the brush seal part 200.

In particular, according to the exemplary embodiment of the present disclosure, the first insertion hole 120 into which the first fixing member 410 is inserted and the second insertion hole 130 into which the second fixing member 420 is inserted are opened at different positions and therefore the brush seal parts 200 are each fixed at different positions to reduce the movement due to the change in pressure applied to the brush seal part 200 by the high-pressure fluid, thereby constantly maintaining the fluid flow moving through the brush seal part 200.

Further, the fixed state of the brush seal part 200 is stably maintained in both directions including the radial direction or the circumferential direction by the high-pressure fluid.

As the fixing member, any of a pin and a bolt may be optionally used, and both the pin and the bolt may be coupled with the packing body 100 and stably fixed to the outside of the packing body 100 by welding.

For example, as the first fixing member 410, a bolt may be used and as the second fixing member 420, a pin may be used. Or, as both of the first and second fixing members 400, a bolt may be used. However, the first and second fixing members are not particularly limited to a specific form and therefore may be variously changed and selectively used.

Figure 12:
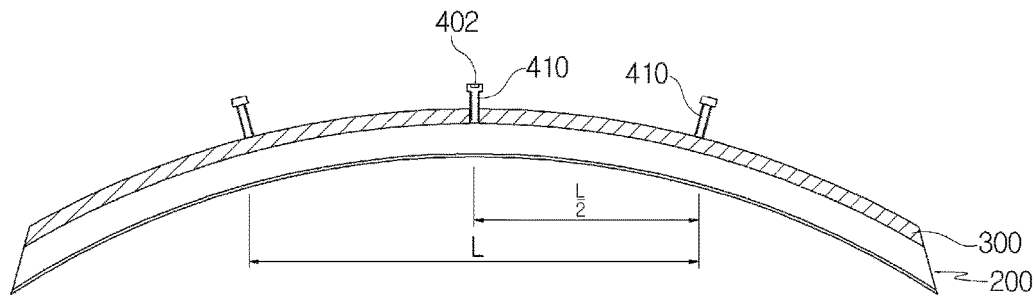
FIG. 12 is a longitudinal cross-sectional view of the brush seal assembly according to the second exemplary embodiment of the present disclosure.
Figure 13:
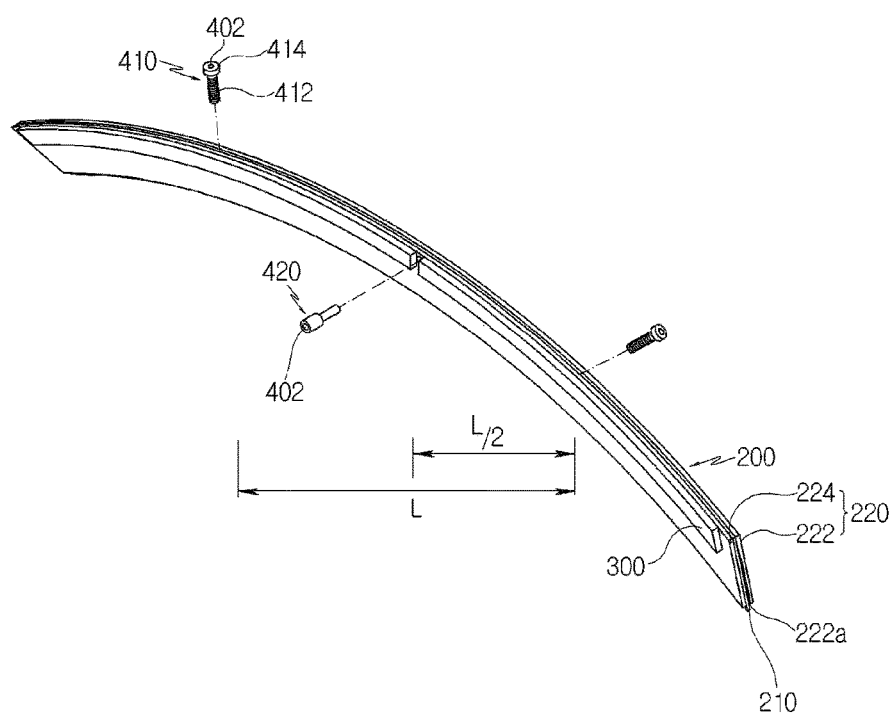
FIG. 13 is a longitudinal cross-sectional view illustrating a state in which the fixed member is installed at the brush seal part according to the second exemplary embodiment of the present disclosure.
Figure 14:
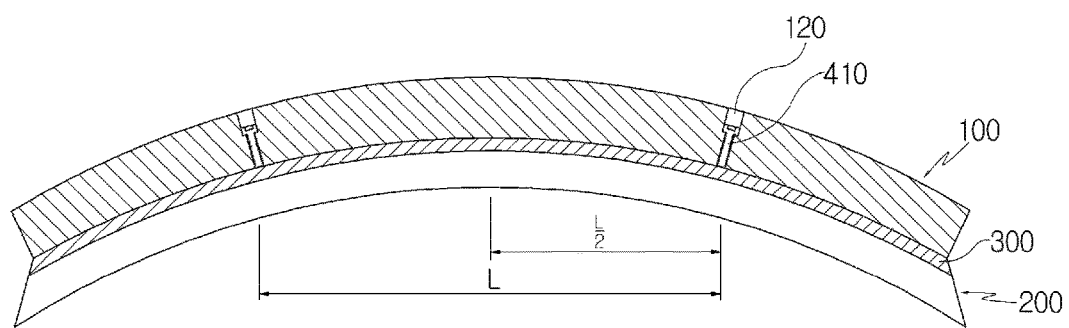
FIG. 14 is a longitudinal cross-sectional view of a brush seal assembly according to another exemplary embodiment of the present disclosure.

Referring to FIGS. 12 to 14, the first fixing member 410 and the second fixing member 420 may be made of a steel material which is not thermally expanded. In this case, the first and second fixing members 410 and 420 fix only the brush seal part 200.

For example, the first fixing member 410 includes a body 412 which contacts the upper surface of the brush seal part 200 and a head 414 which is formed on the upper surface of the body 412, in which the body 414 may be coupled with the first insertion hole 120 in the form in which it is completely inserted into the first insertion hole 120 (see FIG. 14).

Some section of a lower end of the body 412 may not be formed with a thread and may be made of a thermal expansion material and thus the body 412 may be configured to be thermally expanded in the radial direction of the packing body 100. In this case, a portion of the body 412 is assembled in the state in which it is connected, for example by screw, with the first insertion hole 120 and may press the brush seal parts 200 while only some section of the lower end of the body 412 is thermally expanded toward the radial direction.

As a result, even when the brush seal part 200 is applied with the pressure due to the high-pressure fluid, the gap between the rotor 5 and the brush 210 is not spaced apart and is stably maintained. A particular material of the body 412 may be selected in consideration of the stable thermal expansion.

The second fixing member 420 is inserted into the second insertion hole 130, fixes the brush seal parts 200 in the circumferential direction of the packing body 100 and prevents the brush seal part 200 from moving along the insertion groove 110 in the circumferential direction to stably maintain the gap between the outer circumferential surface and the brush 210, thereby uniformly maintaining the movement of fluid through the brush seal part 200.

The second fixing member 420 is inserted into the central position based on the first insertion holes 120 spaced apart from each other and therefore the pressing force applied to the brush seal part 200 by the first fixing member 410 and the pressing force applied by the second fixing member 420 are maintained in a balance state therebetween, thereby stably fixing the brush seal part 200.

Describing in more detail, the pressing force applied to the brush seal part 200 by the first fixing member 410 is applied in the radial direction of the brush seal part 200 and the pressing force applied by the second fixing member 420 is also applied in the circumferential direction of the brush seal part 200.

In this case, the second fixing member 420 fixes the brush seal part 200 at the position of ½*L if it is assumed that the distance from the first fixing member 410 is L and therefore is fixed to the insertion groove 110 in the state in which the pressing force applied by the first fixing member 410 from a front portion or a rear portion of the brush seal part 200 may be constantly maintained.

Therefore, the fixing force of the brush seal part 200 is relatively enhanced and thus the occurrence of vibration due to the high-pressure fluid may be reduced.

The first fixing member 410 may be pressed inward based on the radial direction of the packing body in the state in which the lower end thereof adheres to the upper surface of the brush seal part 200, and the second fixing member 420 is positioned at the central of the thermal expansion member 300 to prevent the packing body 100 from moving in the circumferential direction.

The second fixing member 420 is positioned at the center of the thermal expansion member 300 to install the brush seal part 200. In this case, when the thermal expansion member 300 is thermally expanded in the length direction, the brush seal parts 200 are prevented from moving in the specific left and right directions, thereby stably maintaining the state in which the brush seal part 200 is positioned at the regular position.

The fixing member 400 includes a tool insertion groove 402 formed on the upper surface thereof. A tool corresponding to a shape of the tool insertion groove 402 may be inserted thereto and thus the installation and release of the fixed member 400 may be conveniently made. As a result, the workability of the worker is enhanced and time required to install and remove the plurality of fixing members 400 is shortened.

The support member 220 includes the first support plate 222 which adheres to one side of the brush 210 and the second support plate 224 which adheres to the other side of the brush 210. The first support plate 222 is provided with the guide groove 222a to guide the flow of fluid from the inside facing the brush 210 toward the lower portion of the brush 210 so as to induce the flow of the high-pressure fluid to the gap between the rotor 5 and the brush 210, thereby implementing the stable movement.

Therefore, when the high-pressure fluid moves to the brush 210 through the first support plate 222, the unnecessary eddy phenomenon may be reduced and the flow of fluid toward the lower end of the brush 210 may be induced.

For reference, the pressure at the right of the brush 210 (PH) is relatively higher than the pressure at the left of the brush 210 (PL). The flow of the fluid moves from the right to the left as illustrated by a dotted arrow, and the brush 210 may prevent the fluid in the high-pressure region from being leaked to the low-pressure region.

The thickness of the second support plate 224 is formed to correspond to that of the first support plate 222 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove may be formed at a position facing the thermal expansion member 300 to stably install and expand the thermal expansion member 300.

The brush 210 may be made of a plurality of bristles. The first support plate 222 and the second support plate 224 adhere to each other based on the brush 210 and
degrees to reduce the stress applied from the rotor 5.

A brush seal assembly according to a third exemplary embodiment of the present disclosure will be described with reference to the accompanying drawings.

Figure 15:
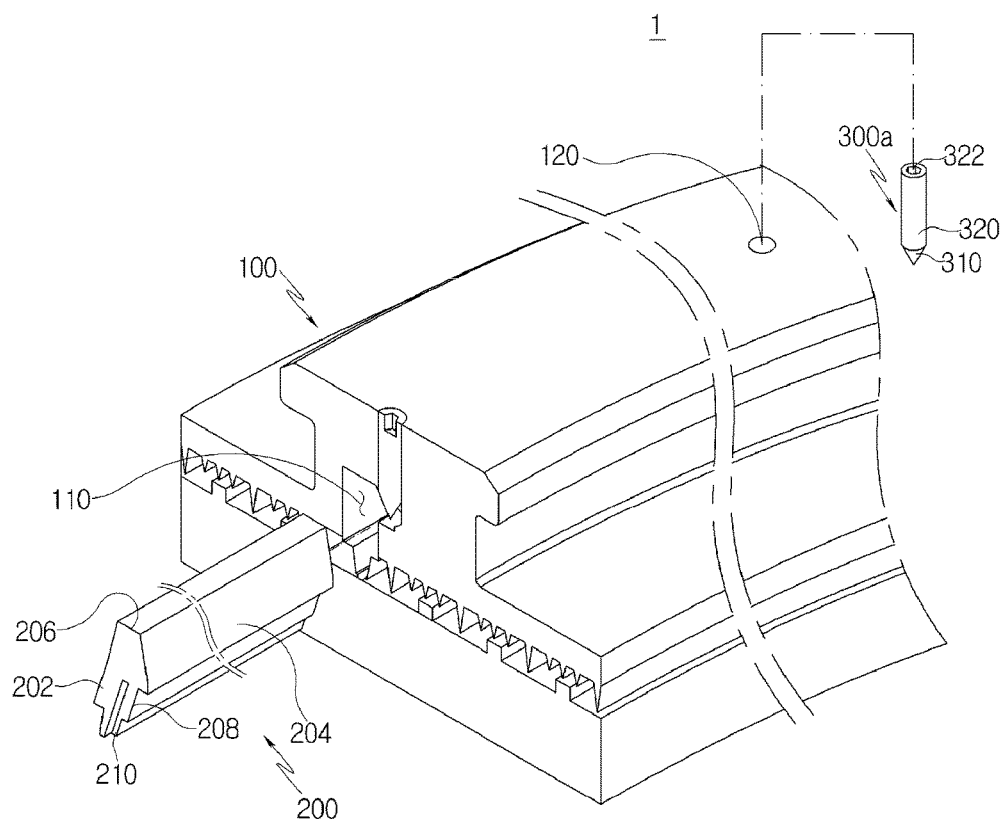
FIG. 15 is an exploded perspective view of a brush seal assembly according to a third exemplary embodiment of the present disclosure.
Figure 16:
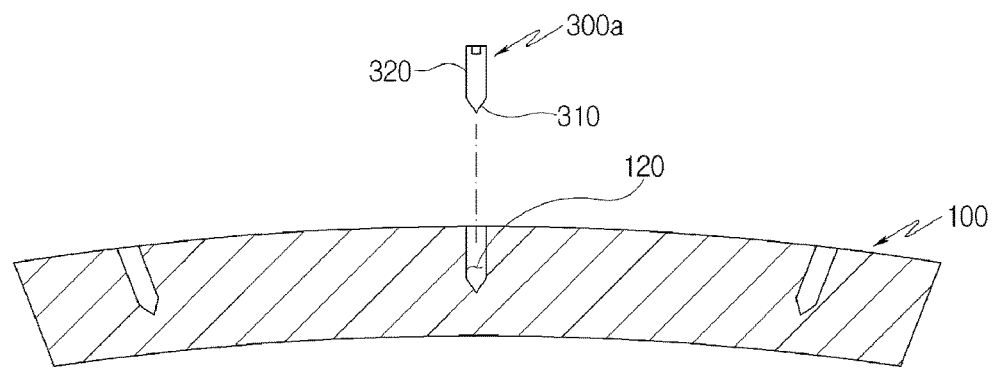
FIG. 16 is a perspective view illustrating a state in which the fixing member is inserted into a packing body according to a third exemplary embodiment of the present disclosure.

Referring to FIGS. 1, 15 and 16, the fixed body includes the casing 3 and the diaphragm 4 and the rotating body includes the rotor 5 and the bucket 6. The diaphragm 4 is coupled with the casing 3 and is disposed to be adjacent to the bucket 6. The bucket 6 integrally rotates with the rotor 5 in the state in which it is adjacent to the diaphragm 4.

There is a need to seal between a gap between the diaphragm 4 and the bucket 6 and the gap between the diaphragm 4 and the rotor 5 for airtightness. For this purpose, the brush seal assembly 1 is used.

The brush seal assembly 1 may include the packing body 100, the brush seal part 200, and fixing members 300a, in which the brush seal part 200 stably maintains the airtightness between the rotor 5 rotating at a predetermined speed and the fixed body.

In this case, the fixed state of the brush seal part 200 is maintained in the radial direction and the circumferential direction of the packing body 100 regardless of the heat conduction transferred to the brush seal part 200 through the rotor 5 and the packing body 100 is pressed and fixed in the radial direction and the circumferential direction at a predetermined pressure, thereby implementing the stable airtightness of the brush seal part 200.

For this purpose, according to the exemplary embodiment of the present disclosure, the packing body 100, which is positioned between the rotor 5 and the fixed body, is formed with the insertion groove 110 positioned to face the rotor 5, and the packing body 100 is formed of a plurality of individual unit bodies and thus is assembled in a ring shape in the outer circumferential direction of the rotor 5.

When the packing body 100 is assembled by inserting the brush seal parts 200 into the insertion grooves 110, the packing body 100 has a ring shape overall and the insertion holes 120 are opened toward the insertion groove 110 in the radial direction on the outer circumferential surface. The plurality of insertion holes 120 are opened toward one side while being spaced apart from each other at the same interval formed on the outer circumferential surface of the packing body 100. The number of insertion holes 120 may be changed without being necessarily limited to the number illustrated in the drawings.

For example, the insertion hole 120 may be opened in the state orthogonal to the packing body 100. The fixing member 300a may be inserted into the insertion hole 120 and then the brush seal parts 200 are maintained in the pressed state at the predetermined pressure in the circumferential direction and the radial direction to stably maintain the fixed state of the brush seal part 200 in the insertion groove 110 even when the high-temperature heat is conducted from the rotor 5 to the brush seal part 200.

The insertion hole 120 is formed in a shape corresponding to the fixing member 300a to be described below to stably maintain the adhering state when the fixing member 300a is inserted into the insertion hole 120 and reduce the change in position due to the thermal expansion of the brush seal part 200, thereby preventing the fluid from unnecessarily leaked and vibration from occurring.

For example, even when the brush seal part 200 is directly or indirectly rubbed with the rotor 5 over a long period of time, the sealing loss due to the abrasion and deformation may be reduced and the gap between the brush 210 and the rotor 5 may be constantly maintained.

As the result, the predetermined quantity of high-pressure fluid may move through the brush 210, thereby reducing the unnecessary leaking flow of fluid.

In particular, when the gap between the rotor 5 and the brush 210 is excessively spaced apart from each other, the high-pressure fluid may be leaked and therefore the power loss of the rotor 5 may be caused.

Further, when the rotor 5 and the brush excessively adhere to each other, an interference may occur between the rotor 5 and the fixed body. As a result, constantly maintaining the gap between the rotor 5 and the brush 210 is considered to be important.

In the brush seal part 200, the pressure at the right of the brush 210 (PH) is relatively higher than the pressure at the left of the brush 210 (PL). The flow of the fluid moves from the right to the left as illustrated by a dotted arrow, and the brush 210 may prevent the fluid in the high-pressure region from being leaked to the low-pressure region.

The brush seal part 200 includes a brush seal body 200 inserted into the insertion groove 110 while being mounted with the brush 210 and includes an inclined surface 204 facing the insertion hole 120 when being viewed from the front and inclined along the length direction, a first stepped part 206 enclosing the brush 210 on the upper portion of the inclined surface 204, extending in one side direction, and having a stepped end, and a second stepped part 208 extending from a lower portion of the inclined surface 204 toward the brush 210 and having an end stepped in one side direction.

Figure 17:
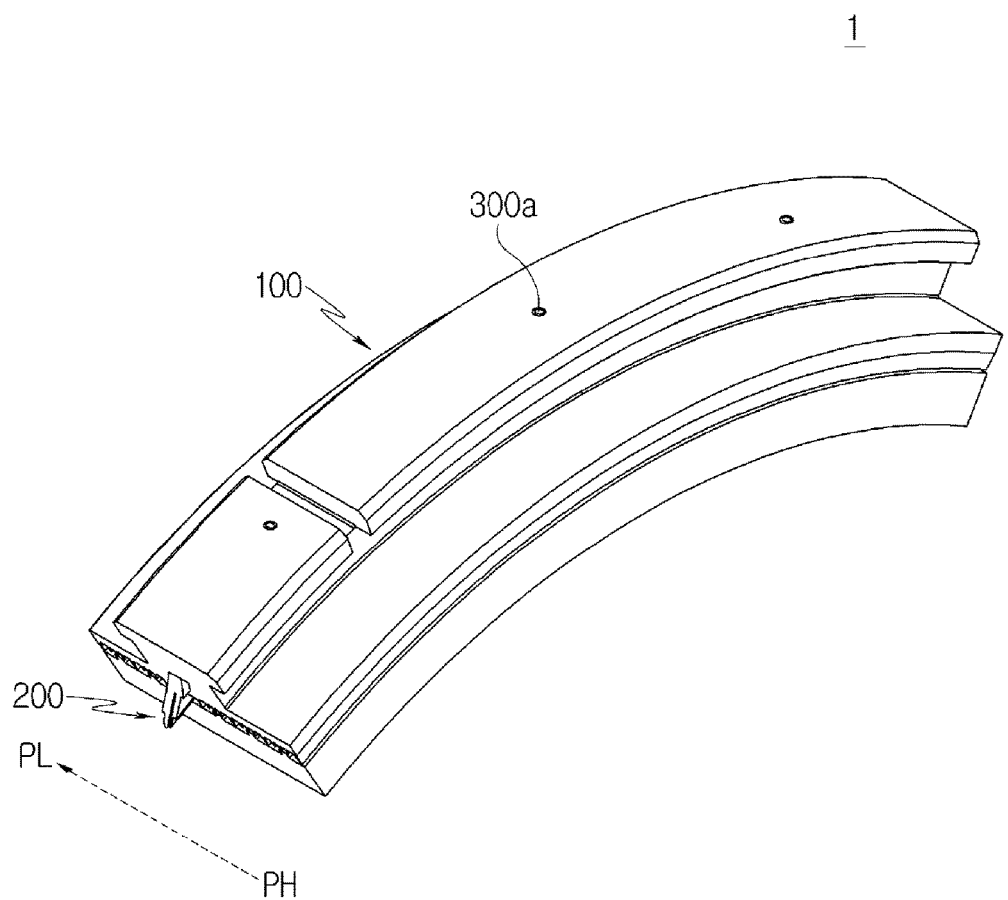
FIG. 17 is a coupled perspective view of the brush seal assembly according to the third exemplary embodiment of the present disclosure.
Figure 18:
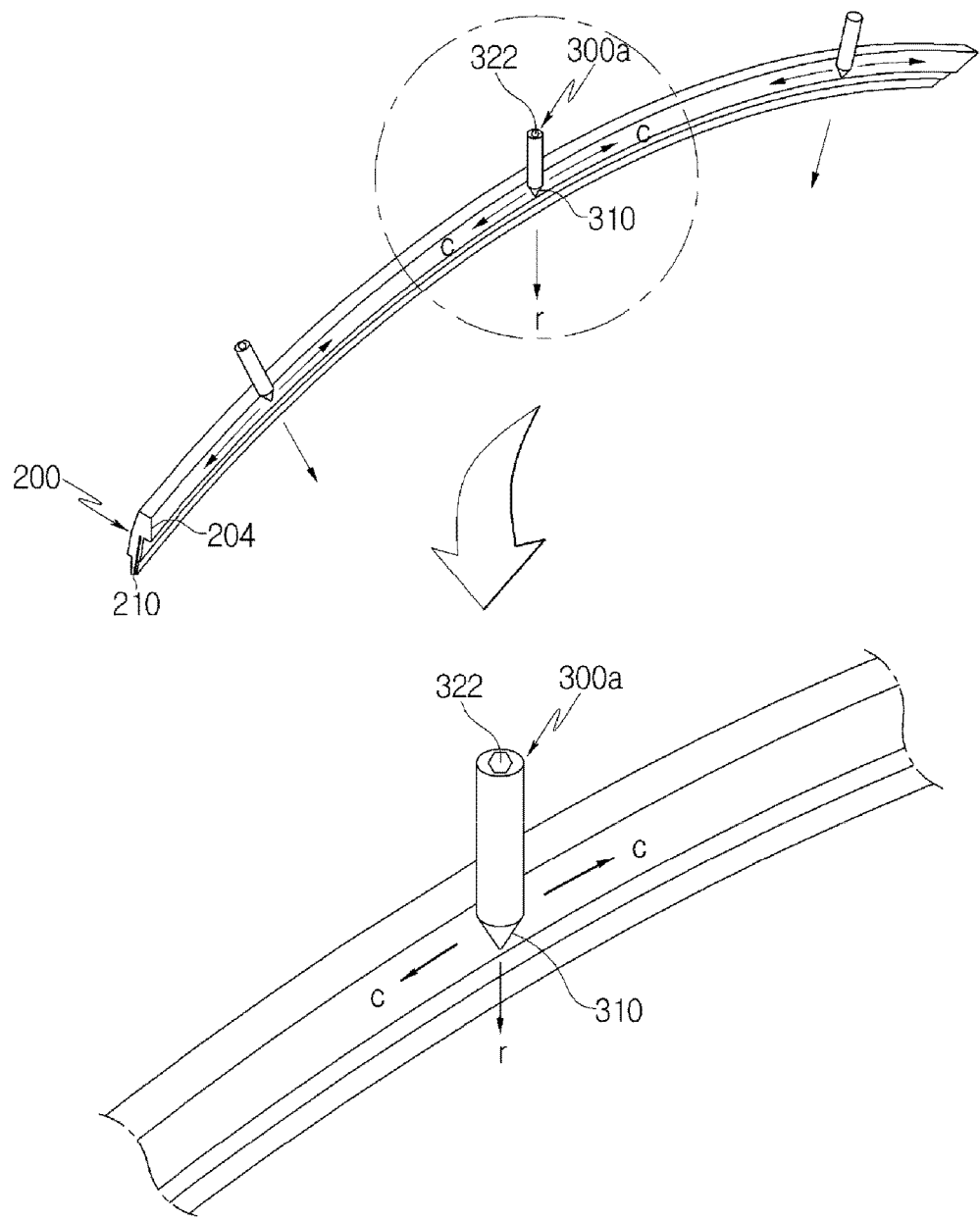
FIG. 18 is a perspective view illustrating a state in which a brush seal part is pressed and fixed in a radial direction and a circumferential direction by the fixing member of the brush seal assembly according to the third exemplary embodiment of the present disclosure.

Referring to FIGS. 17 to 18, the inclined surface 204 directly contacts a head 310 of the fixing member 300a. When the state in which the inclined surface 204 maintains direct contact with the head 310, the pressing force applied by the fixing member 300a presses an inclined surface of a radial direction r and a circumferential direction c of the packing body 100.

In this case, the state in which the brush seal parts 200 are pressed in both directions may be maintained by the fixing member 300a and thus the fixing force of the brush seal part 200 is enhanced. Even when the high-pressure fluid is applied to the brush seal part 200, the fixed state of the brush seal part 200 to the packing body 100 may be stably maintained.

The inclined surface 204 extends in a form inclined upward from the lower end of the insertion hole 120. By the formation, the inclined surface 204 is pressed by the head 310 of the fixing member 300a in the state in which it adheres to the insertion groove 110, thereby stably maintaining the sealed state.

The packing body 100 is maintained having a predetermined gap from the rotor 5 by the pressing force applied in the radial direction and therefore even when the high-pressure fluid is supplied to the brush 210, the unnecessary leakage of fluid due to the pressure difference based on the brush 210 may be avoided, thereby constantly maintaining the efficiency of the object in which the brush seal part 200 is installed.

Further, the position of the packing body 100 may be stably maintained without moving in the instable state at the set position at the time of first designing the brush seal assembly due to the pressing force applied in the circumferential direction to reduce the unnecessary leakage of fluid in the circumferential direction, thereby constantly maintaining the efficiency of the object in which the brush seal part 200 is installed.

The first stepped part 206 horizontally extends toward the left from the upper portion of the inclined surface 204 as much as a predetermined length and the end is inclined downward, based on the drawings. The insertion groove 110 also has a shape corresponding to the first stepped part 206 and thus when the brush seal part 200 is inserted, the sealed state may be more stably maintained to stably prevent the fluid from being leaked even when the high-pressure fluid is applied to the brush seal part 200 and prevent the brush seal part 200 from being deformed, thereby enhancing the durability even at the time of the long-term use.

The second stepped part 208 is formed in a form in which an end extends from the lower end of the inclined surface 204 toward the left by a predetermined length and is stepped. By the formation, when the pressure by the high-pressure fluid is applied to the brush seal 210, the brush seal part 200 inserted into the insertion groove 110 may be stably supported, thereby preventing the fluid from being unnecessarily leaked and enhancing durability.

Therefore, the fluid leakage in the radial direction and the circumferential direction is reduced even under the environment that the high-pressure fluid moves toward the brush 210 in the state in which the brush seal part 200 is inserted into the insertion groove 110.

The fixing members 300a are each inserted into the insertion holes 120 in the radial direction from the outside of the packing body 100, in which the fixing member has a shape corresponding to the shape of the insertion hole 120. Thus when the fixing member 300a is inserted into the insertion hole 120 it may simultaneously implement the pressing on the inclined surface 204 and the stable fixing in the insertion hole 120.

The fixing member 300a includes the head 310 directly contacting the inclined surface 204 and the body 320 extending toward the upper portion of the head 310. For example, the head 310 may have a cone shape and the body extends in a cylindrical shape.

Forming the head 310 in the cone shape to stably maintain the sealed state with the inclined surface 204 is only an example, and therefore the head 310 may be changed to other shapes.

The head 310 is inclined to have the same inclined angle as the inclined surface 204 but maintains the sealed state with the inclined surface 204. Therefore, the head 310 may be maintained in the pressed state toward the inclined surface 204 to maintain the brush seal part 200 in the state adhering to the inside of the insertion groove 110.

The body 320 is formed so that the outer circumferential surface of the body 320 extending to the upper portion of the head 310 has a predetermined diameter, thereby easily implementing the insertion into and decomposition from the insertion 110.

The fixing members 300a are disposed along the length direction of the packing body 100 at a predetermined interval and other fixing members which are positioned at left and right sides of the fixing member which is positioned at the center are inserted into the insertion holes 120 to be inclined at the same angle as the insertion hole 120 to fix the brush seal part 200 in the radial direction and the circumferential direction.

The fixing member 300a includes a tool insertion groove 322 formed to insert a tool into an upper surface of the body 320, in which the tool insertion groove 322 may be formed to use a tool to conveniently draw the fixing members 300a when installing the plurality of fixing members 300a in the packing body 100 or drawing the fixing member to the outside of the packing body 100 for repairing. The tool insertion groove 322 has a polygonal shape or may be changed to other shapes.

The head 310 is made of different materials from the body 320 and is thermally expanded toward the inclined surface 204 in the length direction by the high temperature conducted from the rotor 5, in which the head 310 is thermally expanded toward the radial direction and therefore presses the inclined surface 204 in the radial direction to constantly maintain the gap between the brush 210 and the rotor 5 against the high-pressure fluid.

When the inclined surface 204 is pressed in the radial direction by the fixing member 300a, some of the pressing force is applied in the circumferential direction along the inclined surface 204 and therefore the fixing of the packing body 100 in the radial direction and the circumferential direction is simultaneously maintained.

The head 310 is made of a thermal expansion material, and therefore when the high-temperature heat is conducted, the head 310 is expanded in a lower radial direction in the state in which it contacts the inclined surface 204 to press the inclined surface 204, thereby stably preventing the movement of the brush seal part 200 due to the pressure of fluid directly applied to the brush seal part 200 and the vibration transferred from the rotor 5.

A brush seal assembly according to a fourth exemplary embodiment of the present disclosure will be described with reference to the accompanying drawings.

Figure 19:
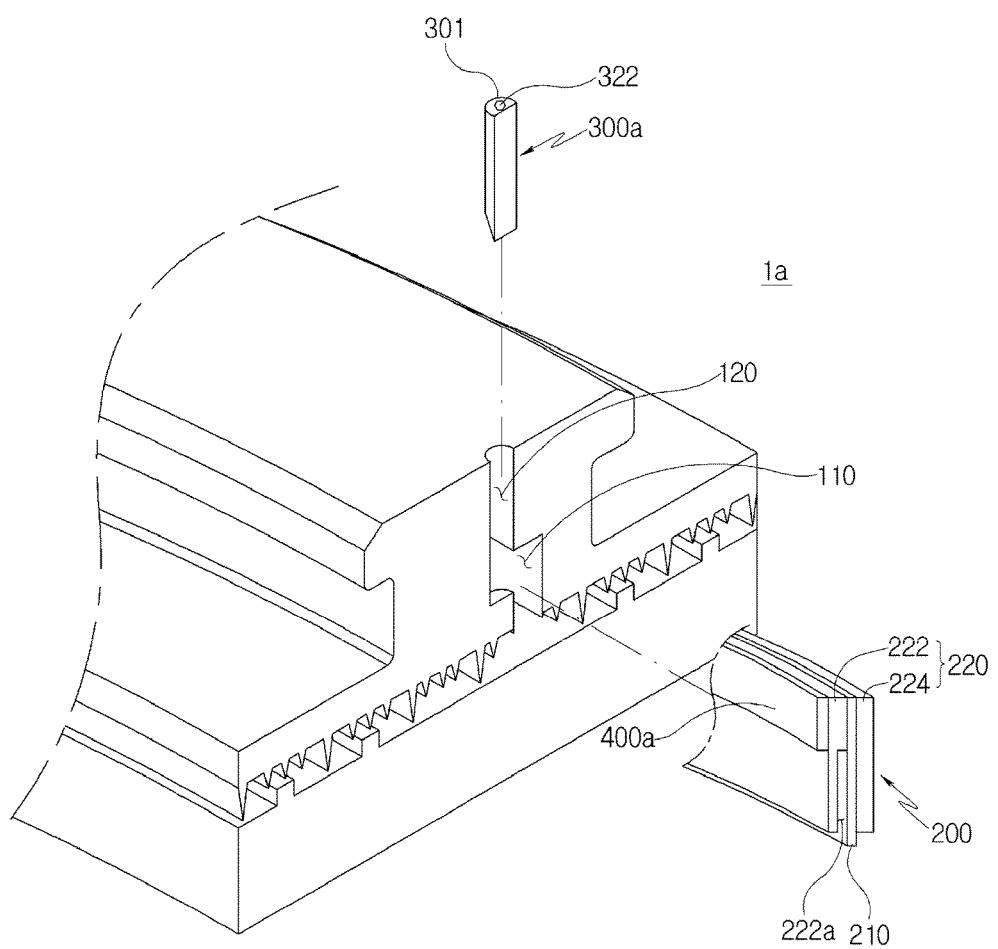
FIG. 19 is an exploded perspective view of a brush seal assembly according to a fourth exemplary embodiment of the present disclosure.

Referring to FIG. 1 or 19, the brush seal assembly 1a includes the packing body 100, the brush seal part 200, a thermal expansion member 400a, and the fixing member 300a.

According to the exemplary embodiment of the present disclosure, the brush seal assembly 1a includes the insertion groove 110 which is positioned between the rotor 5 and the fixed body and is formed inside the circumferential direction. The packing body 100 may have an outer circumferential surface provided with the insertion hole 120 opened toward the insertion groove 110 in the radial direction. The brush 210 may extend toward the rotor 5 in the state in which one end thereof is inserted into the insertion groove 110. The brush seal part 200 may include the support member 220 supporting the brush 210. The thermal expansion member 400a may adhere to the side of the support member 220 and thermally expand in the circumferential direction of the packing body 100, and the fixing member 300a may be inserted into the insertion hole 120 to be fixed on the side of the brush seal part 200 and in the circumferential direction.

According to the exemplary embodiment of the present disclosure, the fixing members 300a are each inserted into the front and rear end portions of the packing body 100, respectively to prevent the position of the brush seal part 200 from being changed in the circumferential direction when an external force due to the high-pressure fluid is applied to the packing body 100.

In more detail, the insertion holes 120 are each positioned at the front and rear end portions of the packing body 100 and are opened in a form corresponding to the fixing member 300a to be described below.

According to the exemplary embodiment of the present disclosure, based on the drawings, the insertion hole 120 is opened from the outside of the packing body 100 toward the insertion hole 110 and the fixing member 300a is inserted into the insertion hole 120 to fix the brush seal part 200.

The insertion hole 120 is positioned at the left based on the brush seal part 200, but the insertion hole 120 may be formed at the left and right sides and the side of the brush seal part 200 may be maintained in the fixed state by the foregoing fixing member 300a.

The fixing member 300a is formed in a shape corresponding to the insertion hole 120 and includes a protrusion 301 protruding in one direction, in which the protrusion 301 is formed to prevent the fixing member 300a from being separated to the outside after the fixing member 300a is inserted into the insertion hole 120.

Preferably, the protrusion 301 has a polygonal shape but may be variously changed in a circular shape or other shapes and therefore it is to be noted that the protrusion 301 may be changed to other shapes to prevent the fixing member 300a from being separated.

The protrusions 301 are disposed to face each other when all the fixing members 300a are inserted into the packing body 100. This may uniformly maintain the supporting force in the circumferential direction of the packing body 100. Even when the brush seal part 200 moves in the insertion groove 110, the brush seal part may be stably set at the initial position by the fixing member 300a.

The fixing member 300a has the upper surface provided with the tool insertion groove 322 into which the tool is inserted to conveniently draw the fixing member 300a when installing the plurality of fixing members 300a in the packing body 100 or drawing the fixing member to the outside of the packing body 100 for repairing. The tool insertion groove 322 has a polygonal shape or may be changed to other shapes.

Figure 20:
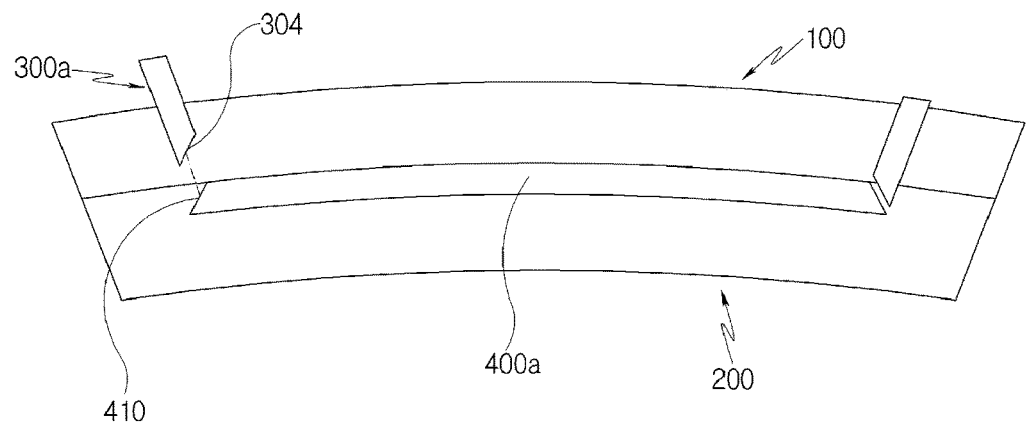
FIG. 20 is a perspective view illustrating a state in which the fixing member is coupled with the brush seal assembly according to the fourth exemplary embodiment of the present disclosure.
Figure 21:
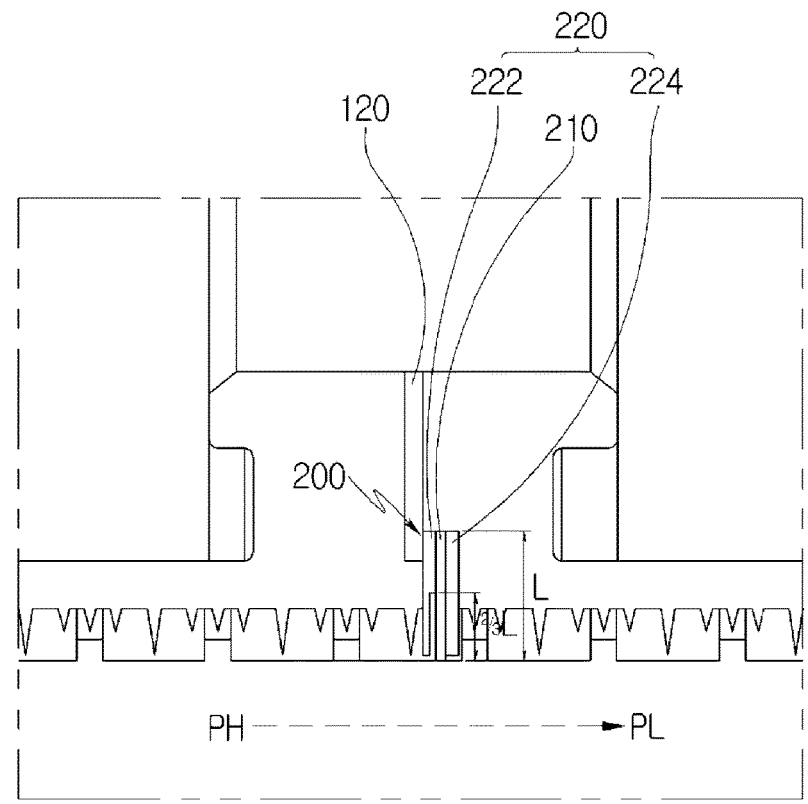
FIG. 21 is a diagram schematically illustrate a disposition state of a thermal expansion member and a fixing member in the brush seal assembly according to the fourth exemplary embodiment of the present disclosure.

Referring to FIGS. 20 and 21, the head 310 is maintained in the state in which it contacts the thermal expansion member 400a but when the head 310 is thermally expanded, the thermal expansion between the head 310 and the thermal expansion member 400a is made and thus the pressing is made in the radial direction of the packing body 100.

The thermal expansion member 400a includes the inclined surface of which the longitudinal both ends are inclined toward the fixing member 300a. The head 310 includes a head inclined surface 304 which contacts the inclined surface 410 in the adhering state. When the inclined surface 410 and the head inclined surface 304 are each formed, the pressing is made between the inclined surface 410 and the head inclined surface 304 while the thermal expansion is made in the sealed state therebetween under the condition that the high-temperature heat is conducted to the thermal expansion member 400a and the head 310.

As such, when the thermal expansion member 400a and the head inclined surface 304 are simultaneously thermally expanded, the position fixing of the brush seal part 200 is simultaneously made in the radial direction and the circumferential direction of the packing body 100 and therefore the change in position due to the high-pressure fluid is reduced.

Therefore, the fluid moving through the brush seal part 200 moves through the brush 210 as much as a predetermined amount to prevent the fluid from being unnecessarily leaked to enhance the efficiency of the object in which the brush seal assembly is installed and reduce the vibration from occurring between the rotor 5 and the brush seal part 200, thereby implementing the stable operation.

The inclined surface 410 and the head inclined surface 304 may have variously inclined directions to press the brush seal part 200 either inward or outward in the packing body 100. For example, when the inclined surface 410 is inclined upward, the head inclined surface 304 is inclined downward on the contrary to this and thus the sealed state between the inclined surface 410 and the head inclined surface 304 may be stably made.

Further, when the inclined surface 410 is inclined downward, the head inclined surface 304 is inclined upward, the sealed state between the inclined surface 410 and the head inclined surface 304 may be stably made.

The contact between the inclined surface 410 and the head inclined surface 304 may be variously changed to other forms other than the foregoing form. The inclined surface 410 and the head inclined surface 304 may be thermally expanded in the relative state therebetween and thus it is to be noted that the inclined surface 410 and the head inclined surface 304 may be used while being variously changed to other forms which may maintain the pressed and fixed state of the brush seal part 200 toward the radial direction of the packing body 100.

Only a predetermined section of both ends in a length direction of the thermal expansion member 400a is made of the thermal expansion material and thus may be thermally expanded. In this case, the thermal expansion material may be minimally used and thus economical efficiency may be enhanced and the thermal expansion is made only at the specific position and thus responsiveness may be enhanced, thereby stabilizing the position fixing of the brush seal part 200.

The brush seal part 200 includes the brush 210 and the support member 220. The brush 210 may be formed of a plurality of bristles and the material thereof is not particularly limited.

The support member 220 includes the first support plate 222 which adheres to one side of the first brush 210 and the second support plate 224 which adheres to the other side of the first brush 210. The first support plate 222 is provided with the guide groove 222a to guide the flow of fluid from the inside facing the brush 210 toward the lower portion of the brush 210 so as to induce the flow of the high-pressure fluid to the gap between the rotor 5 and the brush 210, thereby implementing the stable movement.

Therefore, when the high-pressure fluid moves to the brush 210 through the first support plate 222, the unnecessary eddy phenomenon may be reduced and the flow of fluid toward the lower end of the brush 210 may be induced.

For reference, the pressure at the right of the brush 210 (PH) is relatively higher than the pressure at the left of the brush 210 (PL). The flow of the fluid moves from the right to the left as illustrated by a dotted arrow, and the brush 210 may prevent the fluid in the high-pressure region from being leaked to the low-pressure region.

When the length of the first support plate 222 is set to be L, the guide groove 222a is formed in an opened state up to a height corresponding to $\frac{2}{3}$L or more from a lower portion. When the height of the guide groove 222a is formed at a length which is less than the middle, it is difficult to stably guide the high-pressure fluid and when the height of the guide groove 222a extends to a length of $\frac{2}{3}$L or more, stiffness of the first support plate 222 may be weakened, and therefore it is preferable that the guide groove 222a is formed at the foregoing height.

In addition to the illustrated shape, the shape of the guide groove 222a may be changed to the rounded shape and may be optimally set through the simulation depending on the movement of the high-pressure fluid.

Figure 22:
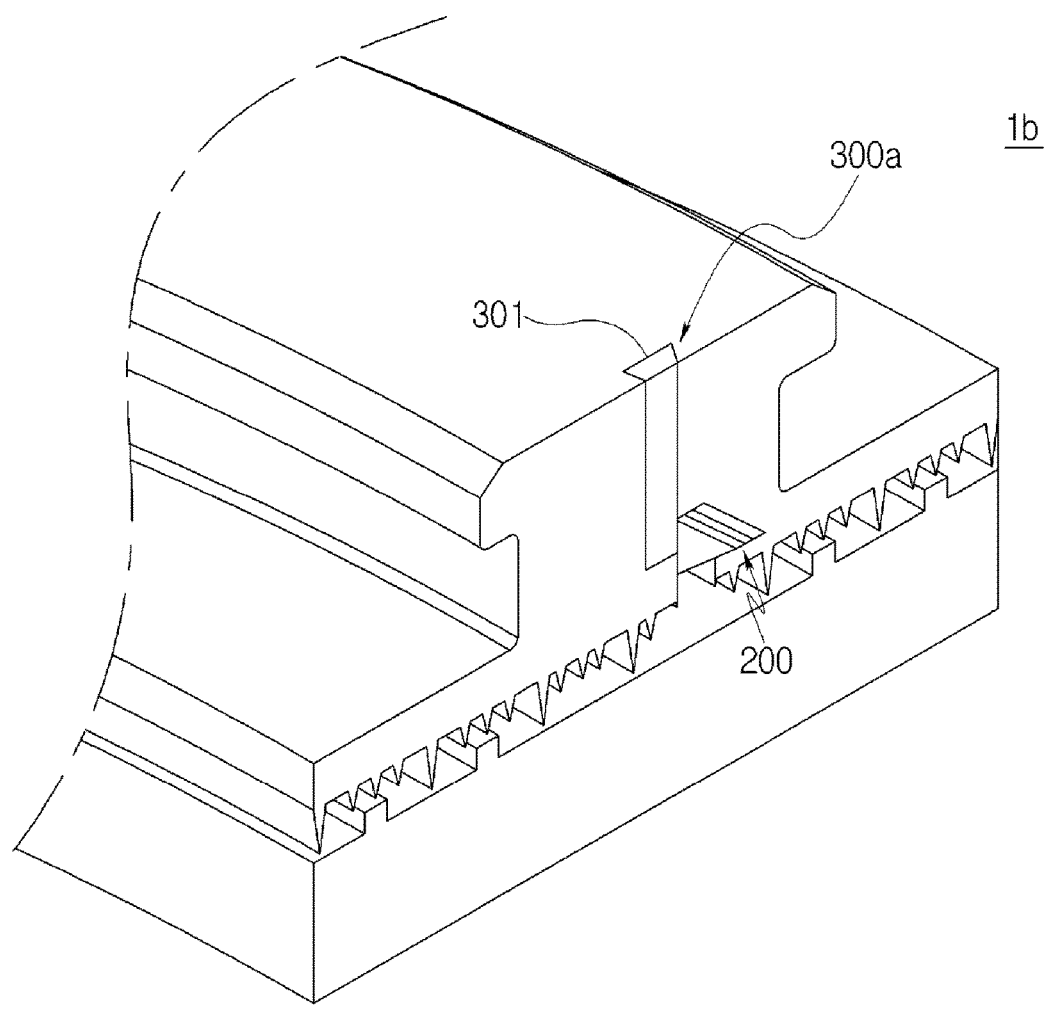
FIG. 22 is a front view of a brush seal assembly according to another exemplary embodiment of the present disclosure.

Referring to FIG. 22, in a brush seal assembly 1b according to another exemplary embodiment of the present disclosure, the fixing member 300a is provided with the protrusion 301 and thus is inserted into the insertion hole 120 and may be changed to an angled shape other than the rounded shape.

A use state of the brush seal assembly according to the first exemplary embodiment of the present disclosure configured as described above will be described with reference to the accompanying drawings.

Figure 23:
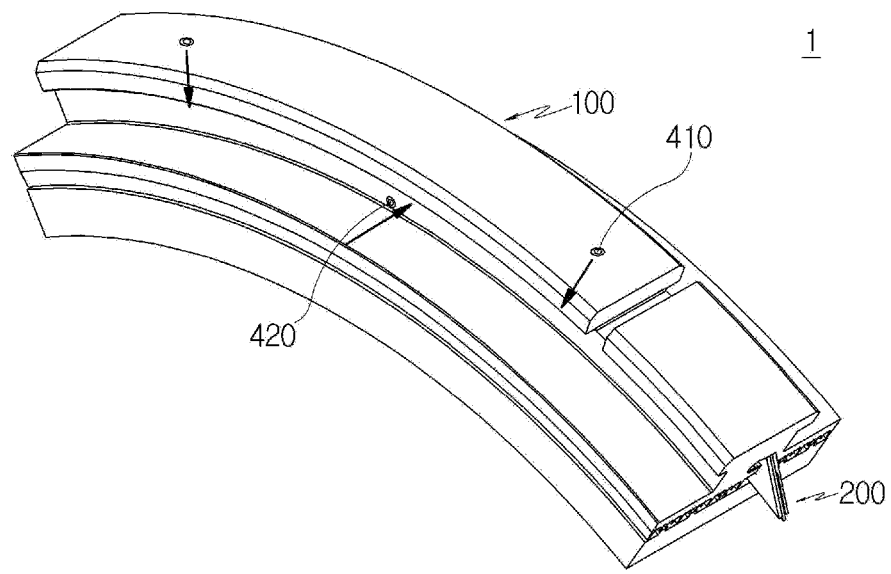
FIG. 23 is an operational state diagram of the brush seal assembly according to the first exemplary embodiment of the present disclosure.

Referring to FIG. 2 or 23, the brush seal part 200 is maintained in the fixed state in the radial direction and the circumferential direction of the packing body 100 by the first fixing member 410 and the second fixing member 420.

The pressure is directly applied to the brush seal 210 while the high-pressure fluid moves through the brush seal part 200 and the pressing force is applied upward with respect to a Z axis through the rotor 5.

In this case, the first fixing member 410 presses the upper surfaces of the support member 220 and the brush 210 in the circumferential direction as illustrated in an arrow to maintain the fixed state of the brush seal part 200 in the whole radial direction and the second fixing member 420 maintains the fixed pressing force at the center of the side of the brush seal part 200.

The second fixing member 420 maintains the fixed state of the end of the second fixing member 420 to the side of the second support member 220 even when the brush seal part 200 is applied with a force moving to the front end or the rear end based on the circumferential direction to stably fix the brush seal parts 200 in the circumferential direction.

Therefore, the movement of the brush seal part 200 due to the high-pressure fluid may be avoided and thus the flow of gas through the brush 210 may be constantly maintained, thereby enhancing the efficiency of the object in which the brush seal assembly 1c is installed and addressing the problem due to the fluid leakage.

A use state of the brush seal assembly according to a second exemplary embodiment of the present disclosure will be described with reference to the accompanying drawings.

Figure 9:
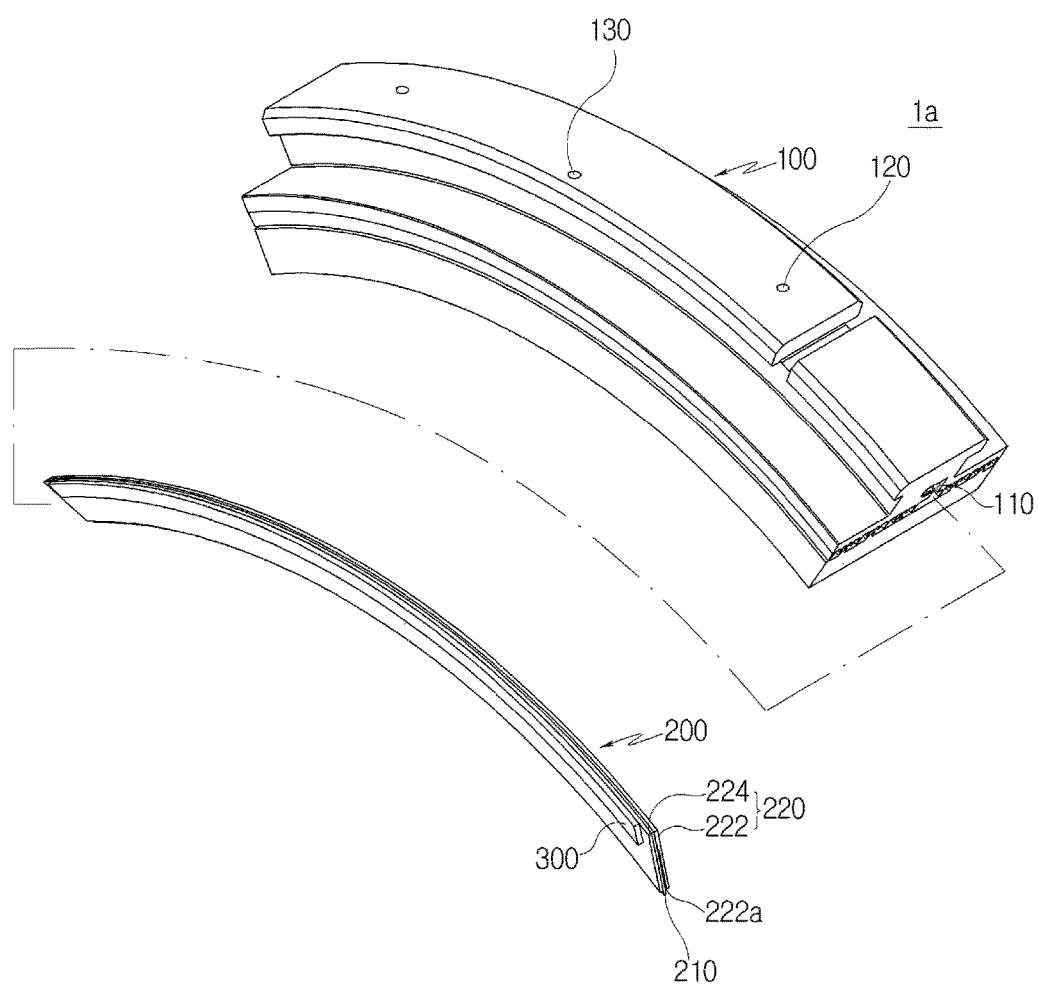
FIG. 9 is an exploded perspective view of the brush seal assembly according to the second exemplary embodiment of the present disclosure.
Figure 10:
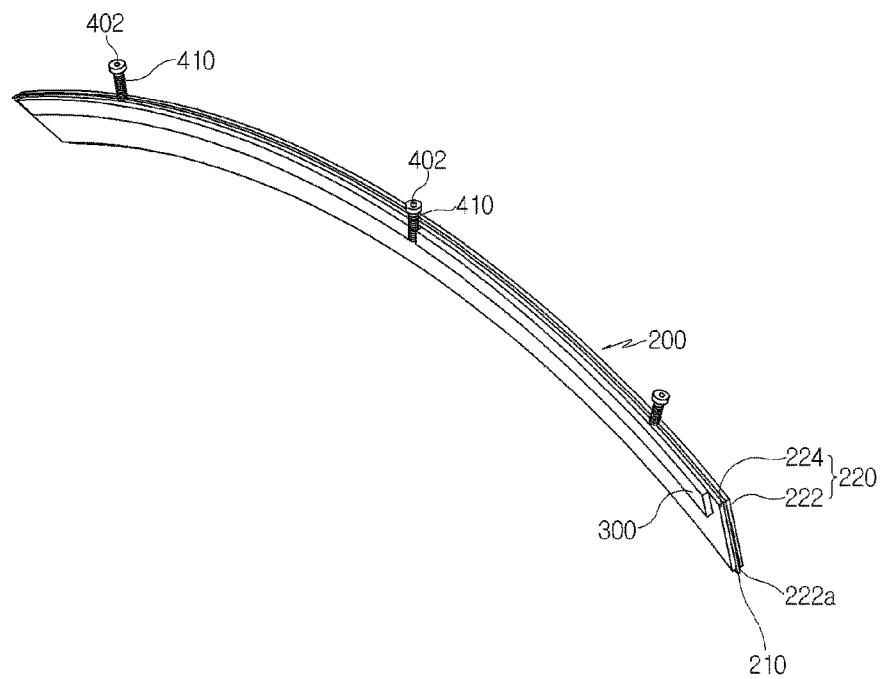
FIG. 10 is a perspective view illustrating a state in which the fixed member is positioned at the brush seal assembly according to the second exemplary embodiment of the present disclosure.
Figure 11:
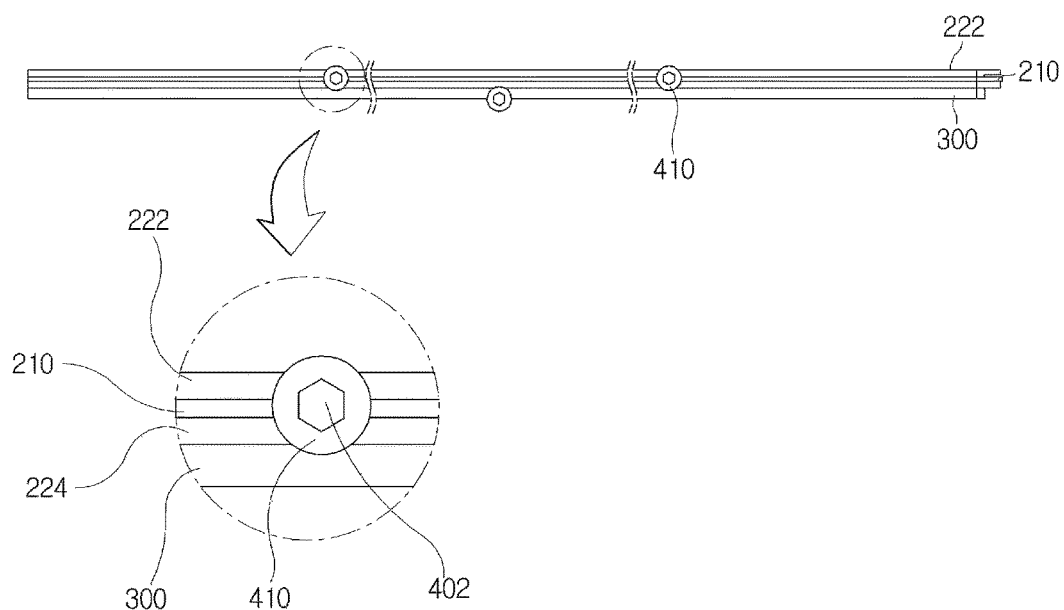
FIG. 11 is a plan view illustrating a state in which the fixed member is fixed to a brush seal part according to a second exemplary embodiment of the present disclosure.
Figure 24:
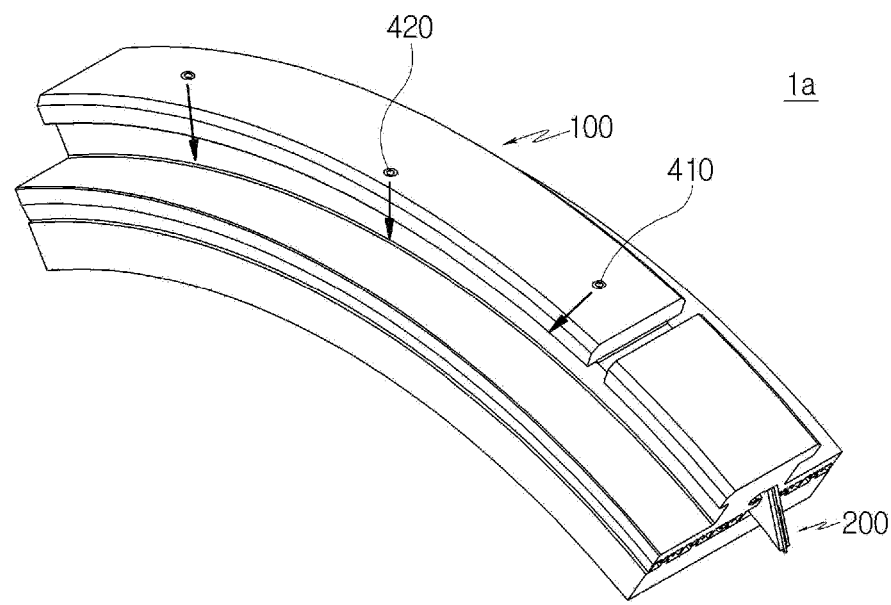
FIG. 24 is an operational state diagram of the brush seal assembly according to the second exemplary embodiment of the present disclosure.

Referring to FIG. 9 or 24, the brush seal part 200 is maintained in the fixed state in the radial direction and the circumferential direction of the packing body 100 by the first fixing member 410 and the second fixing member 420.

The pressure is directly applied to the brush seal 210 while the high-pressure fluid moves through the brush seal part 200 and the pressing force is applied upward with respect to a Z axis through the rotor 5.

In this case, the first fixing member 410 presses the upper surfaces of the support member 220 and the brush 210 in the circumferential direction as illustrated in an arrow to stably maintain the fixed state of the brush seal part 200 in the whole radial direction and the second fixing member 420 presses the upper surfaces of the brush seal part 200 at different positions from the fixing member 410 to maintain the fixed state of all the brush seal parts 200.

The first and second fixing members 400 partially maintain the fixing of the brush seal part 200 in the radial direction and the circumferential direction and therefore even when the force to move the brush seal part 200 in the radiation direction or the circumferential direction due to the high-pressure fluid is applied, the brush seal part 200 is maintained in the stably fixed state.

Therefore, the movement of the brush seal part 200 due to the high-pressure fluid may be avoided and thus the flow of gas through the brush 210 is constantly maintained, thereby enhancing the efficiency of the object in which the brush seal assembly 1a is installed and addressing the problem due to the fluid leakage.

A use state of the brush seal assembly according to the third exemplary embodiment of the present disclosure configured as described above will be described with reference to the accompanying drawings.

Figure 25:
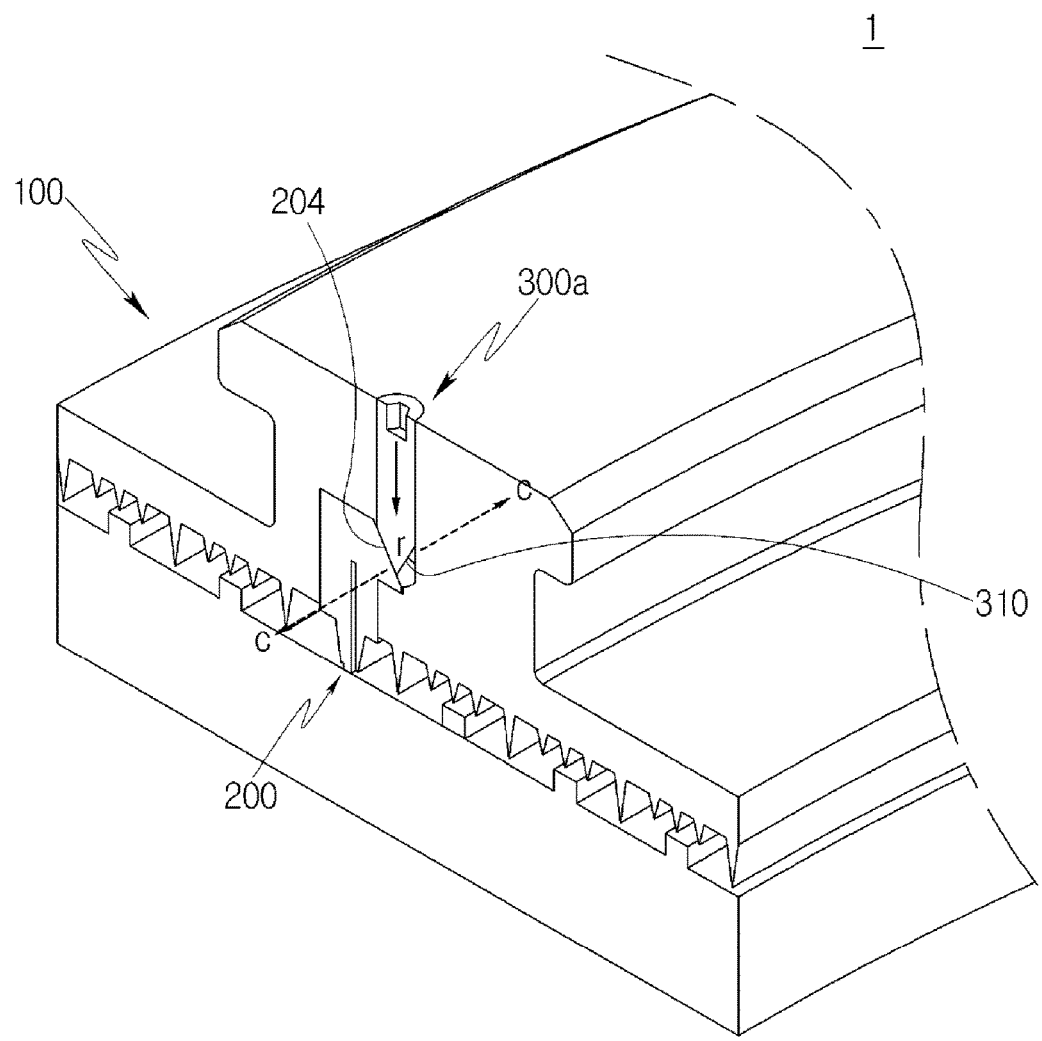
FIG. 25 is an operational state diagram of the brush seal assembly according to the third exemplary embodiment of the present disclosure.

Referring to FIG. 15 or 25, a worker inserts the brush seal part 200 into the packing body 100 and then fixes the previously inserted brush seal part 200 in the circumferential direction by the fixing member 300a.

As illustrated in the enlarged view, the fixed member 300a maintains the fixed state of the brush seal part 200 to the packing body 100 by allowing the inclined surface 204 to press the brush seal body 202 in a r direction which is the radial direction of the packing body and a C direction which is the circumferential direction by the head 310.

In this state, when the high-pressure fluid moves to the brush seal part 200, the pressing force by the fluid and the pressing force and the vibration transferred from the rotor 5 toward the brush 210 are simultaneously transferred to the brush seal part 200.

According to the exemplary embodiment of the present disclosure, the head 310 of the fixing member 300a presses the inclined surface 204 inward in the radial direction which is an arrow direction and thus the pressing force transferred from the rotor 5 prevents the brush seal part 200 from being separated from the insertion groove 110 or the position of the brush seal part 200 from being changed, thereby stably maintaining the brush seal part 200 in the inserted state.

The brush seal part 200 is maintained in the stably fixed state in the radial direction by the fixing member 300a and the pressing force is dispersed in the length direction of the inclined surface 204 in the circumferential direction by the head 310, thereby stably maintaining the initially installed position of the brush seal part 200 without the brush seal part 200 moving in one direction from the insertion groove 110.

As the result, the gap between the brush 210 and the rotor 5 may be constantly maintained and the fluid may moves constantly through the brush 210, thereby constantly maintaining the efficiency of the object in which the brush seal assembly 1 is installed.

The foregoing head 310 may be made of the thermal expansion material. In this case, the inclined surface 204 is more quickly pressed toward the radial direction by the high-temperature heat conducted from the rotor, thereby stably fixing the brush seal part 200 in the insertion groove 110.

In the case of performing the exchange or check of the brush 210 in use, when the tool insertion groove 322 is inserted with the tool to rotate the brush 210 in one direction, the fixing member 300a is conveniently separated from the insertion hole. After the presence or absence of abnormality is checked, the fixing member 300a is easily re-assembled or components to be replaced are enough to replace.

An operational state of the brush seal assembly according to the fourth exemplary embodiment of the present disclosure will be described with reference to the accompanying drawings.

Figure 26:
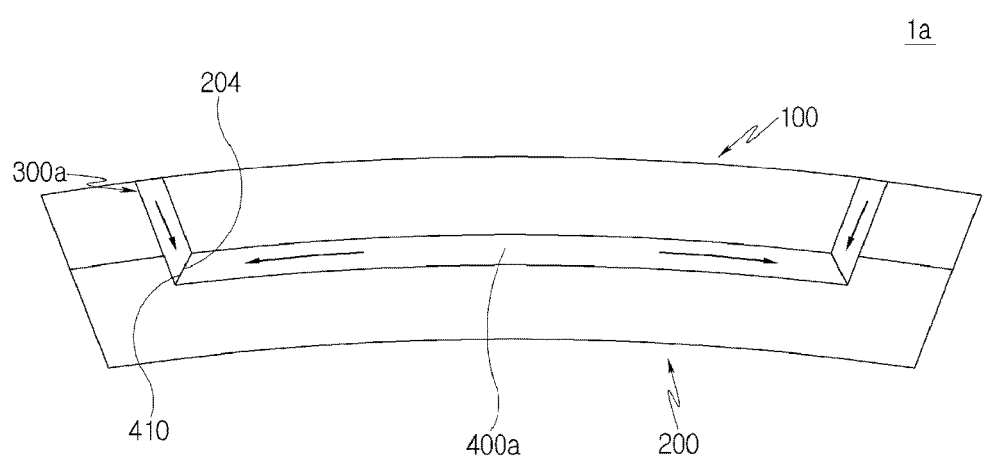
FIG. 26 is an operational state diagram of the brush seal assembly according to the fourth exemplary embodiment of the present disclosure.

Referring to FIG. 18 or 26, a worker inserts the brush seal part 200 into the packing body 100 and then inserts the fixing member 300a into the insertion hole 120.

The fixing member 300a is provided with the protrusion 301 and therefore when the fixing member 300a is inserted into the insertion hole 120, the fixing member 300a is not separated to the outside and fixes the brush seal part 200 in the circumferential direction and the radial direction at the position of the front and rear end portions of the packing body 100.

In particular, the fixing member 300a more stably supports all the brush seal parts 200 together with the first support plate 222 when the pressure by the high-pressure fluid is applied to the brush seal part 200.

In particular, when the high-temperature heat is applied to the thermal expansion member 400a through the fluid, the head inclined surface 204 adhering to the inclined surface 204 is simultaneously thermally expanded due to the expansion of the thermal expansion member 400a and is maintained in the pressed state either inward or outward in the radial direction. Therefore, the high-pressure fluid moving through the brush 210 constantly moves through the brush 210 and therefore the unnecessary leakage of fluid is reduced and the predetermined quantity of fluid moves, thereby enhancing the efficiency of the object in which the brush seal assembly 1a is installed and reducing the occurrence of vibration.

According to the exemplary embodiments of the present disclosure, it is possible to fix the brush seal assembly at different positions and in different directions to enhance the fixing performance of the brush seal part and maintain the gap from the rotating body to reduce the occurrence of heat and abrasion from the brush, thereby promote silent operation.

Further, according to the exemplary embodiments of the present disclosure, since the predetermined quantity of fluid may pass through the gap between the rotating body and the brush seal, it is possible to enhance the efficiency of the turbine so as to increase the power output, enhance the durability of the brush assembly, prevent the operation stop of the turbine due to failure, and save costs due to replacement and repair.

Further, according to the exemplary embodiments of the present disclosure, since the brush seal assembly is simultaneously fixed in both directions of the radial direction and the circumferential direction by the fixing member, it is possible to prevent the brush seal part from moving due to the change in pressure applied by the high-pressure fluid and the rotating body so as to always move the predetermined quantity of fluid through the brush seal, thereby constantly maintaining the sealed state.

Further, according to the exemplary embodiments of the present disclosure, since the state in which the brush seal part is fixed to the packing body may be constantly maintained, it is possible to suppress the occurrence of abrasion and deformation even at the time of the long-term use, thereby enhancing the durability and saving costs involved in the repair and replacement.

While the present invention has been described with respect to the specific embodiments, it will be apparent to those skilled in the art that various changes and modifications may be made without departing from the spirit and scope of the invention as defined in the following claims.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A brush seal assembly, comprising:
   a packing body that includes an insertion groove defined therein formed inward in a circumferential direction, the insertion groove positioned between a rotating body and a fixed body, the packing body further including insertion holes having openings defined therein disposed toward the insertion groove at different positions and in different directions;
   a brush seal part including a brush and a support member that supports the brush, the brush extending toward the rotating body when the brush is disposed in the insertion groove;
   a thermal expansion member disposed between a side of the support member and the packing body and operable to thermally expand in a circumferential direction of the packing body; and
   a plurality of fixing members operable to be inserted into the insertion holes, respectively, from an outside of the packing body to maintain a fixed state of the brush seal part in radial and circumferential directions of the packing body, wherein
   the insertion holes include
      first insertion holes having openings disposed toward the insertion groove in the radial direction of the packing body and extending over the brush such that a first of the plurality of fixing members when inserted in one of the first insertion holes is operable to engage the brush; and
      second insertion holes having openings disposed toward the insertion groove in a direction orthogonal to the first insertion holes such that a second of the plurality of fixing members when inserted in one of the second insertion holes is operable to engage the thermal expansion member, and
      the thermal expansion member thermally expands more than the second fixing member.

2. The brush seal assembly of claim 1, wherein one of the second insertion holes is disposed between two of the first insertion holes that are spaced apart from each other at a predetermined interval.

3. The brush seal assembly of claim 1, wherein the first fixing member includes:
   a body operable to contact an upper surface of the brush seal part; and
   a head disposed on an upper surface of the body and operable to couple with the first insertion hole such that the head is disposed completely inside the first insertion hole.

4. The brush seal assembly of claim 3, wherein a lower portion of the body does not include threads and is made of a thermal expansion material operable to thermally expand in the radial direction of the packing body.

5. The brush seal assembly of claim 1, wherein the support member includes:
   a first support plate operable to couple to one side of the brush, the first support plate including a guide groove defined therein operable to guide a flow of fluid from an inside facing the brush toward a lower portion of the brush; and
   a second support plate operable to couple to the brush such that the second support plate faces the first support plate and the thermal expansion member.

6. The brush seal assembly of claim 1, further comprising a plurality of the thermal expansion members that are independently disposed to face each other based on the insertion hole respectively associated therewith.

7. A brush seal assembly, comprising:
   a packing body that includes an insertion groove defined therein formed inward in a circumferential direction, the insertion groove positioned between a rotating body and a fixed body, the packing body further including a plurality of first insertion holes defined therein on an outer circumferential surface and each having an opening disposed toward the insertion groove in a radial direction, and a second insertion hole defined therein on the outer circumferential surface at a position different from the plurality of first insertion holes and having an opening disposed toward the insertion groove;
   a brush seal part including a brush and a support member that supports the brush, the brush extending toward the rotating body when the brush is disposed in the insertion groove;

a thermal expansion member disposed between a side of the support member and the packing body and operable to thermally expand in a circumferential direction of the packing body; and a plurality of fixing members operable to be inserted into the first and second insertion holes, respectively, from an outside of the packing body to maintain a fixed state of the brush seal part in radial and circumferential directions of the packing body, wherein the openings of the plurality of first insertion holes are disposed toward the insertion groove in the radial direction of the packing body and extend over the brush such that a first of the plurality of fixing members when inserted is operable to engage the brush, the opening of the second insertion hole is disposed toward the insertion groove at a position that is offset in an axial direction from the first insertion holes such that a second of the plurality of fixing members when inserted in the second insertion hole is operable to engage the thermal expansion member, and the thermal expansion member thermally expands more than the second fixing member.

8. The brush seal assembly of claim 7, wherein the second insertion hole is disposed between two of the first insertion holes that are spaced apart from each other at a predetermined interval.

9. The brush seal assembly of claim 7, wherein the first fixing member is operable to press inward in the radial direction of the packing body when a lower end of the first fixing member engages an upper surface of the brush seal part, and the second fixing member is disposed at a center of the thermal expansion member in a length-wise direction to limit movement of the packing body in the circumferential direction.

10. The brush seal assembly of claim 9, wherein the first fixing member includes:
a body operable to contact an upper surface of the brush seal part; and
a head disposed on an upper surface of the body and operable to couple with the first insertion hole such that the head is disposed completely inside the first insertion hole; and
a lower portion of the body does not include threads and is made of a thermal expansion material operable to thermally expand in the radial direction of the packing body.

11. The brush seal assembly of claim 1, wherein one of the fixing members includes a protrusion in one direction operable to be fixed in a side and a circumferential direction of the brush seal part.

12. The brush seal assembly of claim 11, wherein a protrusion is disposed on the packing body.

13. The brush seal assembly of claim 11, wherein the one of the fixing members includes:
an end operable to contact the thermal expansion member and conduct heat toward the thermal expansion member; and
a body that extends to an upper portion of the head.

14. The brush seal assembly of claim 13, wherein only a predetermined section of both ends of the thermal expansion member in a length-wise direction is made of a thermal expansion material.

15. The brush seal assembly of claim 1, wherein at least one of the openings of the second insertion holes extends toward the insertion groove.

16. The brush seal assembly of claim 1, wherein the first insertion holes extend over a center portion of the brush.

17. The brush seal assembly of claim 7, wherein the first insertion holes extend over a center portion of the brush.

18. The brush seal assembly of claim 1, wherein the second fixing member contacts the thermal expansion member.

19. The brush seal assembly of claim 1, wherein the thermal expansion member contacts the support member.

20. The brush seal assembly of claim 1, wherein the thermal expansion member contacts the second fixing member and the support member.

* * * * *